United States Patent
Tsai et al.

(10) Patent No.: US 9,036,270 B2
(45) Date of Patent: May 19, 2015

(54) OPTICAL LENS SYSTEM

(75) Inventors: Tsung-Han Tsai, Taichung (TW);
Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 575 days.

(21) Appl. No.: 13/532,441

(22) Filed: Jun. 25, 2012

(65) Prior Publication Data

US 2013/0208354 A1 Aug. 15, 2013

(30) Foreign Application Priority Data

Feb. 15, 2012 (TW) .............................. 101104863 A

(51) Int. Cl.
| | | |
|---|---|---|
| *G02B 13/18* | (2006.01) | |
| *G02B 13/00* | (2006.01) | |
| *G02B 9/34* | (2006.01) | |
| *G02B 13/06* | (2006.01) | |
| *G02B 13/22* | (2006.01) | |

(52) U.S. Cl.
CPC ................ *G02B 13/004* (2013.01); *G02B 9/34* (2013.01); *G02B 13/06* (2013.01); *G02B 13/22* (2013.01)

(58) Field of Classification Search
None
See application file for complete search history.

(56) References Cited

U.S. PATENT DOCUMENTS

| | | | | |
|---|---|---|---|---|
| 7,365,920 B2 | 4/2008 | Noda | | |
| 7,848,032 B1 | 12/2010 | Chen et al. | | |
| 8,325,269 B2 * | 12/2012 | Chen et al. | ..................... | 348/360 |
| 8,441,745 B2 * | 5/2013 | Tang et al. | ..................... | 359/717 |
| 8,891,178 B2 * | 11/2014 | Hsu et al. | ..................... | 359/715 |

FOREIGN PATENT DOCUMENTS

CN 202119966 U 1/2012

\* cited by examiner

*Primary Examiner* — Derek S Chapel
(74) *Attorney, Agent, or Firm* — Tim Tingkang Xia, Esq.; Morris, Manning & Martin, LLP

(57) ABSTRACT

This invention provides an optical lens system comprising: a first lens element with negative refractive power having a convex object-side surface; a second lens element with negative refractive power having a concave object-side surface and a convex image-side surface; a third lens element with positive refractive power; a plastic fourth lens element with negative refractive power having a concave object-side surface and a convex image-side surface, with both the object-side and image-side surfaces thereof being aspheric, and having at least one inflection point positioned on at least one of the object-side and image-side surfaces thereof; wherein the number of lens elements with refractive power is limited to four. By such arrangement, especially by the first and the second lens elements with negative refractive power, the system has sufficient back focal length for arranging required optical elements, and thereby is suitable for various applications.

28 Claims, 23 Drawing Sheets

OPTICAL LENS SYSTEM

CROSS-REFERENCE TO RELATED APPLICATIONS

This non-provisional application claims priority under 35 U.S.C. §119(a) on Patent Application No. 101104863 filed in Taiwan R.O.C on Feb. 15, 2012, the entire contents of which are hereby incorporated by reference.

BACKGROUND OF THE INVENTION

1. Field of the Invention

The present invention relates to an optical lens system, and more particularly, to a compact optical lens system used in electronic products.

2. Description of the Prior Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are leaning toward a trend of being more compact, there is an increasing demand for compact imaging lens assembly featuring better image quality.

A conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing.

Besides, although the four-lens system disclosed in U.S. Pat. No. 7,848,032 does not have the aforesaid disadvantages, the system fails to be well-designed for infrared band. In considering the current situation that applications of lens systems capable are getting more and more, the conventional four-lens systems designed can no longer satisfy the current demands in the field.

In light of foregoing, there is a need for a compact lens system with excellent image quality and sensing susceptibility for portable electronic products, which can be applied for various applications.

SUMMARY OF THE INVENTION

The present invention provides an optical lens system, in order from an object side to an image side comprising: a first lens element with negative refractive power having a convex object-side surface; a second lens element with negative refractive power having a concave object-side surface and a convex image-side surface; a third lens element with positive refractive power; a plastic fourth lens element with negative refractive power having a concave object-side surface and a convex image-side surface, with both the object-side and image-side surfaces thereof being aspheric, and having at least one inflection point positioned on at least one of the object-side and image-side surfaces thereof; wherein the number of lens elements with refractive power is limited to four.

On the other hand, the present invention provides an optical lens system, in order from an object side to an image side comprising: a first lens element with negative refractive power having a convex object-side surface; a second lens element with negative refractive power; a third lens element with positive refractive power; a plastic fourth lens element with negative refractive power having a concave object-side surface and a convex image-side surface, and both the object-side and image-side surfaces thereof being aspheric; wherein the number of lens elements with refractive power is limited to four; wherein an angle between a vertical plane to the optical axis and a tangent plane of the image-side surface of the fourth lens element at the position of the farthest clear aperture radius thereof is ANG42; wherein the value of ANG42 is defined as negative while the tangent plane leans to the object-side, whereas defined as positive while the tangent plane leans to the image-side; wherein ANG42 satisfies the following relation: ANG42>0 degree.

Furthermore, the present invention provides an optical lens system, in order from an object side to an image side comprising: a first lens element with negative refractive power having a convex object-side surface; a second lens element with negative refractive power; a third lens element with positive refractive power; a plastic fourth lens element with negative refractive power having a concave object-side surface and a convex image-side surface, and both the object-side and image-side surfaces thereof being aspheric; wherein the shape of the image-side surface of the fourth lens element changes from convex when near the optical axis to concave when away from the optical axis; wherein the number of lens elements with refractive power is limited to four.

By such arrangement, especially by the first and the second lens elements with negative refractive power, the system has sufficient back focal length for arranging required optical elements, and thereby is suitable for various applications.

In the aforementioned optical lens system, when the first lens element and/or the second lens element have negative refractive power, the back focal length can be effectively enlarged for ensuring that the system has enough space for placing required optical elements (such as filters). Therefore, the system can be suitable for infrared imaging systems. When the third lens element has positive refractive power, it is capable of providing the refractive power required for the system and thereby is favorable for reducing the total track length of the system. When the fourth lens element has negative refractive power, a positive-negative telephoto structure is formed with the third lens element so that the back focal length of the system is favorably reduced for obtaining a proper total track length.

In the aforementioned optical lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. When the second lens element has a concave object-side surface and a convex image-side surface, the astigmatism of the system can be favorably corrected. When the fourth lens element has a concave object-side surface and a convex image-side surface, the astigmatism of the system can be favorably corrected. When the shape of the image-side surface of the fourth lens element changes from convex when near the optical axis to concave when away from the optical axis, the distortion resulting from peripheral rays and high order aberration of the system can be effectively corrected for improving resolution. Furthermore, when at least one inflection point is positioned on the fourth lens elements, the incident angle on the image sensor from the off-axis field can be suppressed, and thereby the sensing sensitivity of the image sensor can be improved as well as the off-axis aberration can be corrected.

DETAILED DESCRIPTION OF THE PREFERRED EMBODIMENTS

Figure 1A:
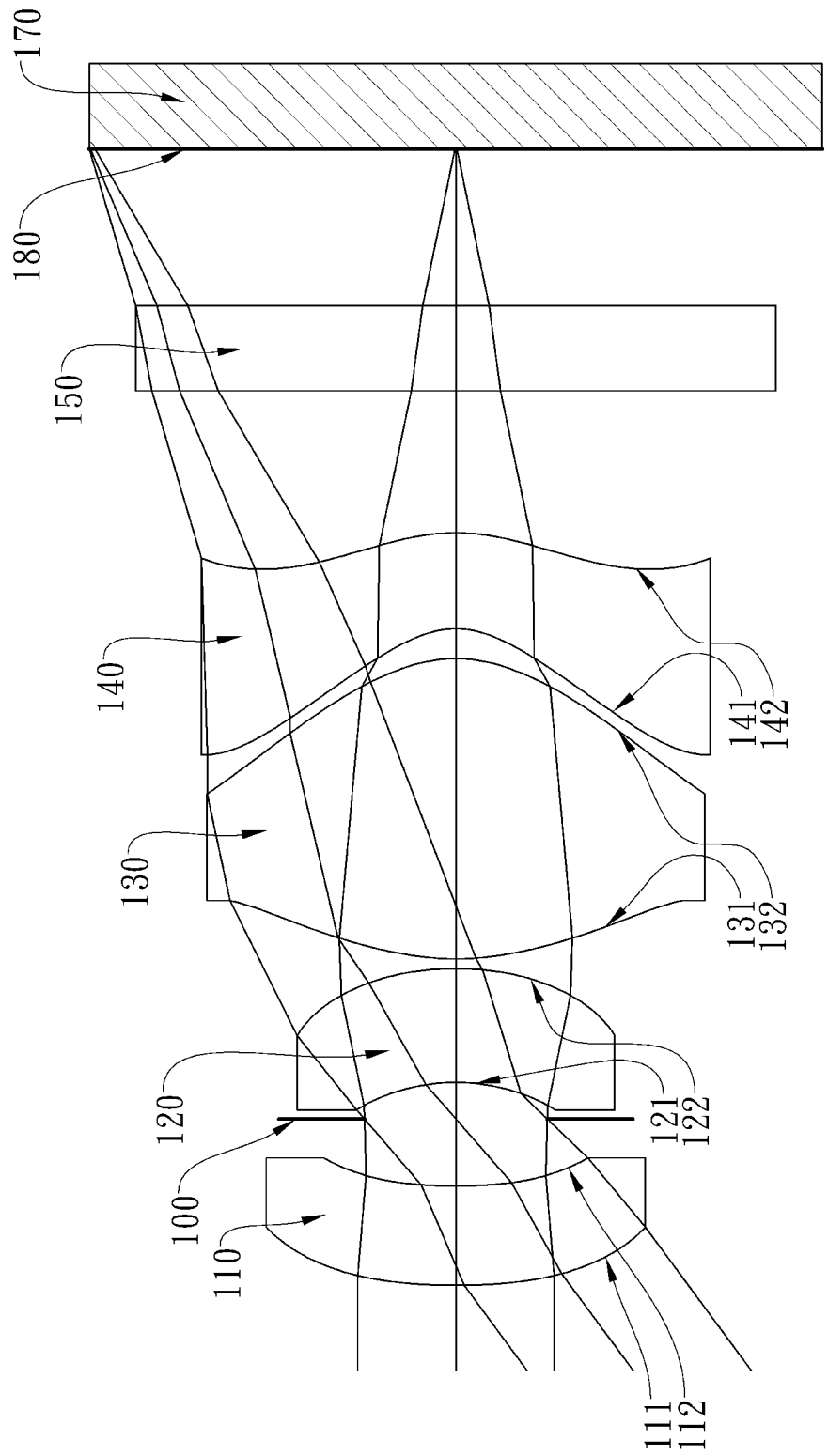
FIG. 1A shows an optical lens system in accordance with a first embodiment of the present invention.

The present invention provides an optical lens system, in order from an object side to an image side comprising: a first lens element with negative refractive power having a convex object-side surface; a second lens element with negative refractive power having a concave object-side surface and a convex image-side surface; a third lens element with positive refractive power; a plastic fourth lens element with negative refractive power having a concave object-side surface and a convex image-side surface, with both the object-side and image-side surfaces thereof being aspheric, and having at least one inflection point positioned on at least one of the object-side and image-side surfaces thereof; wherein the number of lens elements with refractive power is limited to four.

In the aforementioned optical lens system, a curvature radius of the object-side surface of the third lens element is R5, a curvature radius of the image-side surface of the third lens element is R6, and they preferably satisfy the following relation: $-1.0<(R5+R6)/(R5-R6)<1.0$. When the above relation is satisfied, the spherical aberration of the system can be favorably corrected; more preferably, the following relation is satisfied: $-0.5<(R5+R6)/(R5-R6)<0.5$.

In the aforementioned optical lens system, a curvature radius of the object-side surface of the fourth lens element is R7, a curvature radius of the image-side surface of the third lens element is R6, and they preferably satisfy the following relation: $0<R7/R6<0.9$. When the above relation is satisfied, the curvature of the third lens element and the fourth lens element is more proper for reducing the interval space between lens elements so that the total track length of the optical lens system can be shortened.

In the aforementioned optical lens system, a focal length of the optical lens system is f, a focal length of the first lens element is f1, a focal length of the second lens element is f2, and they preferably satisfy the following relation: $-1.2<f/f1+f/f2<-0.35$. When the above relation is satisfied, the distribution of the refractive power of the first lens element and the second lens element is more balanced, and thereby a sufficient back focal length can be provided while not resulting in an excessively long total track length.

In the aforementioned optical lens system, the system further comprising a stop, an axial distance between the stop and the image-side surface of the fourth lens element is SD, an axial distance between the object-side surface of the first lens element and the image-side surface of the fourth lens element is TD, and they preferably satisfy the following relation: $0.50<SD/TD<0.90$. When the above relation is satisfied, it is favorable for the system to obtain a balance between the properties of telecentricity and wild field of view.

In the aforementioned optical lens system, the focal length of the optical lens system is f, a curvature radius of the object-side surface of the first lens element is R1, and they preferably satisfy the following relation: $0<f/R1<2.4$. When the above relation is satisfied, a sufficient field of view can be provided for gathering more light for imaging.

In the aforementioned optical lens system, an axial distance between the second lens element and the third lens element is T23, an axial distance between the third lens element and the fourth lens element is T34, a central thickness of the third lens element is CT3, and they preferably satisfy the following relation: $0<(T23+T34)/CT3<0.40$. When the above relation is satisfied, the relation of the thickness of the third lens element and the interval space between the third lens element and the former and rear lens elements thereof is more suitable; therefore, the image quality can be improved while not resulting in an excessively long total track length.

In the aforementioned optical lens system, half of the maximal field of view of the optical lens system is HFOV, and it preferably satisfies the following relation: $0.35<\tan(HFOV)$ <1.2. When the above relation is satisfied, a sufficient field of view is ensured for the system.

In the aforementioned optical lens system, an angle between a vertical plane to the optical axis and a tangent plane of the image-side surface of the fourth lens element at the position of the farthest clear aperture radius thereof is ANG42; wherein the value of ANG42 is defined as negative while the tangent plane leans to the object-side, whereas defined as positive while the tangent plane leans to the image-side, and it preferably satisfies the following relation: ANG42>0 degree. When the above relation is satisfied, the distortion resulting from peripheral rays and high order aberration can be favorably corrected for providing higher resolution for the system.

In the aforementioned optical lens system, the focal length of the optical lens system is f, a focal length of the third lens element is f3, and they preferably satisfy the following relation: $1.5<f/f3<2.7$. When the above relation is satisfied, the refractive power of the third lens element is more proper for reducing the total track length of the system favorably.

In the aforementioned optical lens system, the focal length of the third lens element is f3, a focal length of the fourth lens element is f4, and they preferably satisfy the following relation: $-1.0<f3/f4<0$. When the above relation is satisfied, it is ensured that a positive-negative telephoto structure formed by the third lens element and the fourth lens element is made for effectively reducing the optical total track length of the system.

In the aforementioned optical lens system, the system is preferably applicable for the wavelength range of 750 nm ~1200 nm, and thereby the system is suitable for various applications.

On the other hand, the present invention provides an optical lens system, in order from an object side to an image side comprising: a first lens element with negative refractive power having a convex object-side surface; a second lens element with negative refractive power; a third lens element with positive refractive power; a plastic fourth lens element with negative refractive power having a concave object-side surface and a convex image-side surface, and both the object-side and image-side surfaces thereof being aspheric; wherein the number of lens elements with refractive power is limited to four; wherein an angle between a vertical plane to the optical axis and a tangent plane of the image-side surface of the fourth lens element at the position of the farthest clear aperture radius thereof is ANG42; wherein the value of ANG42 is defined as negative while the tangent plane leans to the object-side, whereas defined as positive while the tangent plane leans to the image-side; wherein ANG42 satisfies the following relation: ANG42>0 degree.

When the relation of ANG>0 degree is satisfied, the distortion resulting from peripheral rays and high order aberration can be favorably corrected for providing higher resolution for the system.

In the aforementioned optical lens system, the focal length of the optical lens system is f, a curvature radius of the object-side surface of the first lens element is R1, and they preferably satisfy the following relation: $0<f/R1<2.4$. When the above relation is satisfied, a sufficient field of view can be provided for gathering more light for imaging.

In the aforementioned optical lens system, a curvature radius of the object-side surface of the third lens element is R5, a curvature radius of the image-side surface of the third lens element is R6, and they preferably satisfy the following relation: $-1.0<(R5+R6)/(R5-R6)<1.0$. When the above relation is satisfied, the spherical aberration of the system can be favorably corrected.

In the aforementioned optical lens system, half of the maximal field of view of the optical lens system is HFOV, and it preferably satisfies the following relation: $0.35<\tan(HFOV)<1.2$. When the above relation is satisfied, a sufficient field of view is ensured for the system.

In the aforementioned optical lens system, an axial distance between the second lens element and the third lens element is T23, an axial distance between the third lens element and the fourth lens element is T34, a central thickness of the third lens element is CT3, and they preferably satisfy the following relation: $0<(T23+T34)/CT3<0.40$. When the above relation is satisfied, the relation of the thickness of the third lens element and the interval space between the third lens element and the former and rear lens elements thereof is more suitable; therefore, the image quality can be improved while not resulting in an excessively long total track length.

In the aforementioned optical lens system, the focal length of the third lens element is f3, a focal length of the fourth lens element is f4, and they preferably satisfy the following relation: $-1.0<f3/f4<0$. When the above relation is satisfied, it is ensured that a positive-negative telephoto structure formed by the third lens element and the fourth lens element is made for effectively reducing the optical total track length of the system.

In the aforementioned optical lens system, the system is preferably applicable for the wavelength range of 750 nm ~1200 nm, and thereby the system is suitable for various applications.

Furthermore, the present invention provides an optical lens system, in order from an object side to an image side comprising: a first lens element with negative refractive power having a convex object-side surface; a second lens element with negative refractive power; a third lens element with positive refractive power; a plastic fourth lens element with negative refractive power having a concave object-side surface and a convex image-side surface, and both the object-side and image-side surfaces thereof being aspheric; wherein the shape of the image-side surface of the fourth lens element changes from convex when near the optical axis to concave when away from the optical axis; wherein the number of lens elements with refractive power is limited to four.

In the aforementioned optical lens system, the focal length of the optical lens system is f, a curvature radius of the object-side surface of the first lens element is R1, and they preferably satisfy the following relation: $0<f/R1<2.4$. When the above relation is satisfied, a sufficient field of view can be provided for gathering more light for imaging.

In the aforementioned optical lens system, a curvature radius of the object-side surface of the third lens element is R5, a curvature radius of the image-side surface of the third lens element is R6, and they preferably satisfy the following relation: $-0.5<(R5+R6)/(R5-R6)<0.5$. When the above relation is satisfied, the spherical aberration of the system can be favorably corrected.

In the aforementioned optical lens system, an axial distance between the second lens element and the third lens element is T23, an axial distance between the third lens element and the fourth lens element is T34, a central thickness of the third lens element is CT3, and they preferably satisfy the following relation: $0<(T23+T34)/CT3<0.40$. When the above relation is satisfied, the relation of the thickness of the third lens element and the interval space between the third lens element and the former and rear lens elements thereof is more suitable; therefore, the image quality can be improved while not resulting in an excessively long total track length.

In the aforementioned optical lens system, the focal length of the optical lens system is f, a focal length of the third lens element is f3, and they preferably satisfy the following relation: 1.5<f/f3<2.7. When the above relation is satisfied, the refractive power of the third lens element is more proper for reducing the total track length of the system favorably.

In the aforementioned optical lens system, the lens elements can be made of glass or plastic material. If the lens elements are made of glass, the freedom for distributing the refractive power of the optical lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the optical lens system can be effectively reduced.

The present optical lens system may comprise at least one stop. Said stop includes but not limits to an aperture stop, a glare stop, or a field stop. Said glare stop or said field stop can be configured for reducing stray light resulting in improved image quality.

In the present optical lens system, the stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enlarging the field of view of the system as well as providing features associated with a wider field of view.

Figure 12:
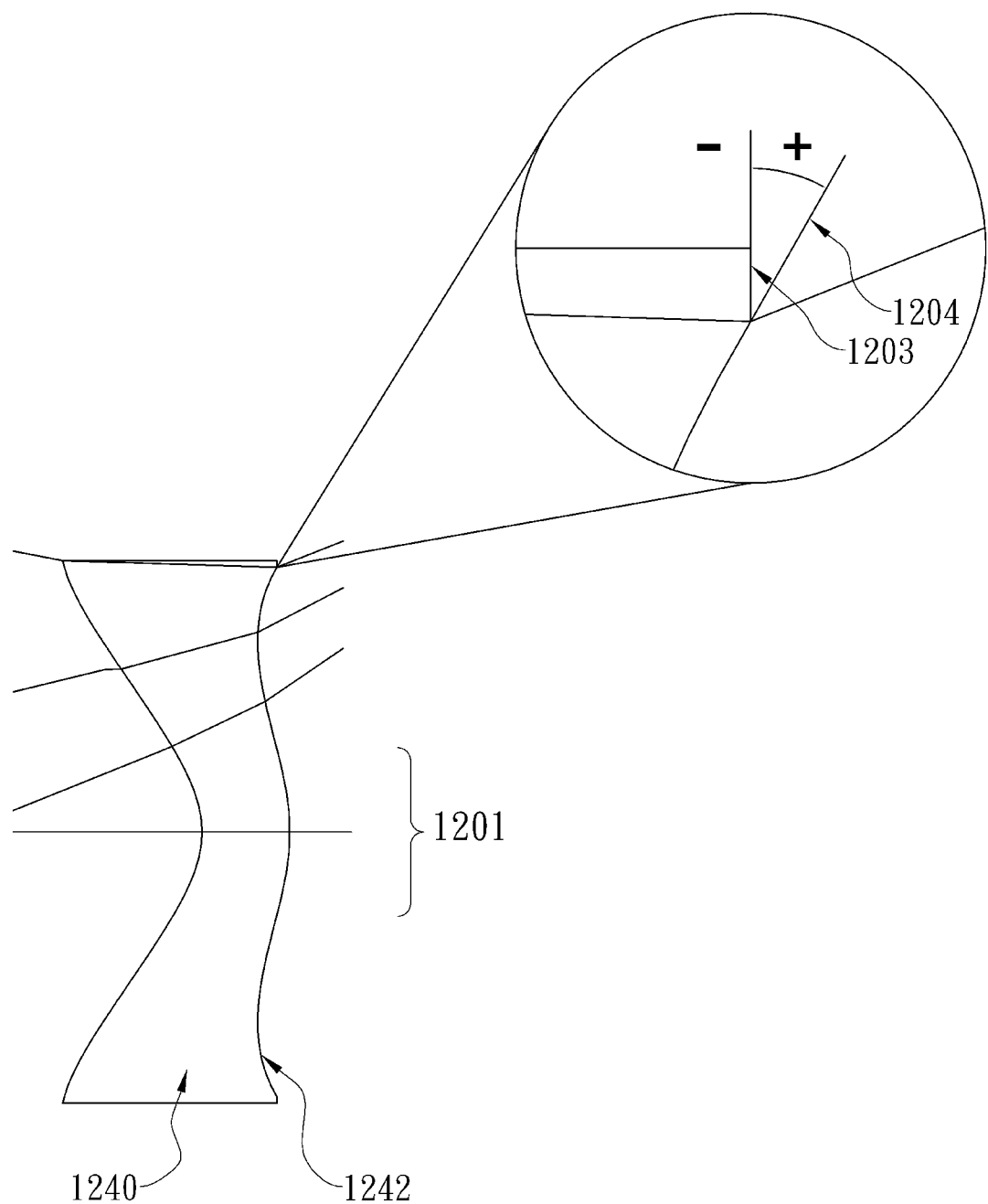
FIG. 12 shows the angle represented by the relation of ANG42 in the present invention and illustrates the technical feature that the shape of the image-side surface of the fourth lens element changes from convex when near the optical axis to concave when away from the optical axis.

In the present optical lens system, if a lens element has a convex surface, it means the portion of the surface in proximity to the optical axis is convex; if a lens element has a concave surface, it means the portion of the surface in proximity to the optical axis is concave. Please refer to FIG. 12, the fourth lens element 1240 has a convex image-side surface 1242. As mentioned before, the image-side surface 1242 is described as convex means that the shape of the image-side surface 1242 of the fourth lens element 1240 at the region near the optical axis 1201 is convex. However, the shape of the image-side surface 1242 of the fourth lens element 1240 changes from convex when near the optical axis to concave when away from the optical axis.

Please refer to FIG. 12 again, an angle between a vertical plane to the optical axis 1203 and a tangent plane 1204 of the image-side surface 1242 of the fourth lens element 1240 at the position of the farthest clear aperture radius thereof is ANG42; wherein the value of ANG42 is defined as negative while the tangent plane 1204 leans to the object-side, whereas defined as positive while the tangent plane 1204 leans to the image-side is.

Preferred embodiments of the present invention will be described in the following paragraphs by referring to the accompanying drawings.

Embodiment 1

Figure 1B:
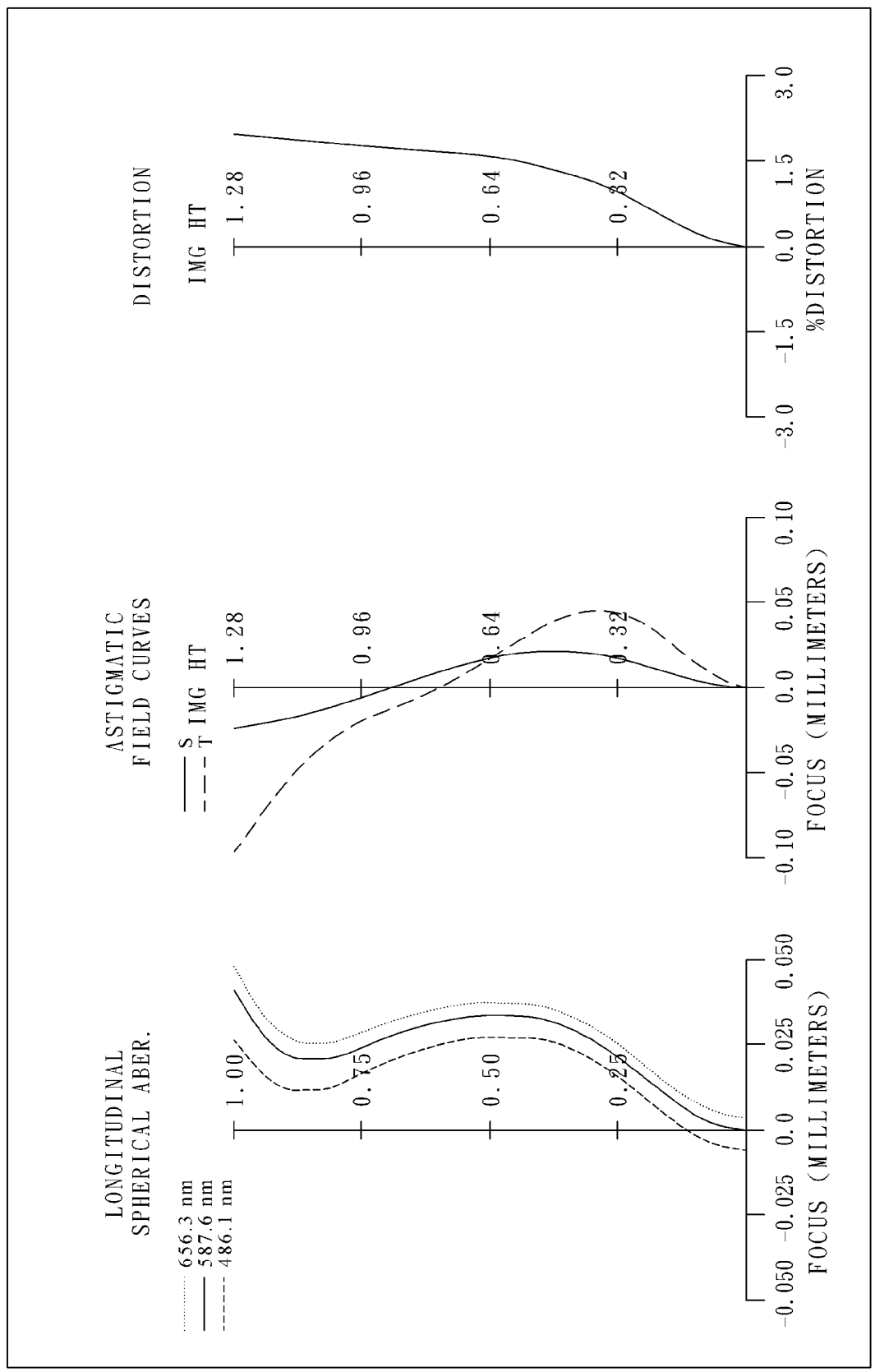
FIG. 1B shows the aberration curves of the first embodiment of the present invention.

FIG. 1A shows an optical lens system in accordance with the first embodiment of the present invention, and FIG. 1B shows the aberration curves of the first embodiment of the present invention. The optical lens system of the first embodiment of the present invention mainly comprises four lens elements, in order from an object side to an image side:

a plastic first lens element 110 with negative refractive power having a convex object-side surface 111 and a concave image-side surface 112, the object-side and image-side surfaces 111 and 112 thereof being aspheric;

a plastic second lens element 120 with negative refractive power having a concave object-side surface 121 and a convex image-side surface 122, the object-side and image-side surfaces 121 and 122 thereof being aspheric;

a plastic third lens element 130 with positive refractive power having a convex object-side surface 131 and a convex image-side surface 132, the object-side and image-side surfaces 131 and 132 thereof being aspheric; and a plastic fourth lens element 140 with negative refractive power having a concave object-side surface 141 and a convex image-side surface 142, the object-side and image-side surfaces 141 and 142 thereof being aspheric, at least one inflection point is positioned on both the object-side surface 141 and the image-side surface 142;

wherein, the shape of the image-side surface 142 of the fourth lens element 140 changes from convex when near the optical axis to concave when away from the optical axis;

wherein a stop, can be an aperture stop 100 is disposed between the first lens element 110 and the second lens element 120;

the optical lens system further comprises a filter 150 disposed between the image-side surface 142 of the fourth lens element 140 and an image plane 180; the filter 150 is an IR cut-filter made of glass and has no influence on the focal length of the optical lens system; the optical lens system further comprises an image sensor 170 provided on the image plane 180.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 1.69 mm, Fno = 2.45, HFOV = 36.5 deg.

| Surface # | | Curvature | Thickness | Material | Index | Focal Length |
|---|---|---|---|---|---|---|
| 0 | Object | Plane | Infinity | | | |
| 1 | Lens 1 | 2.066910 (ASP) | 0.350 | Plastic | 1.535 | −37.60 |
| 2 | | 1.763620 (ASP) | 0.236 | F52R | | |
| 3 | Ape. Stop | Plane | 0.129 | | | |
| 4 | Lens 2 | −0.668270 (ASP) | 0.400 | Plastic | 1.535 | −3.96 |
| 5 | | −1.179610 (ASP) | 0.035 | F52R | | |
| 6 | Lens 3 | 0.886150 (ASP) | 1.058 | Plastic | 1.535 | 0.80 |
| 7 | | −0.478450 (ASP) | 0.105 | F52R | | |
| 8 | Lens 4 | −0.300090 (ASP) | 0.338 | Plastic | 1.607 | −1.29 |
| 9 | | −0.692570 (ASP) | 0.500 | OKP4 | | |
| 10 | Filter | Plane | 0.300 | Glass | 1.510 | — |

TABLE 1-continued (Embodiment 1)
f = 1.69 mm, Fno = 2.45, HFOV = 36.5 deg.

| Surface # | | Curvature | Thickness | Material | Index | Focal Length |
|---|---|---|---|---|---|---|
| 11 | | Plane | 0.552 | HOYA-BSC7 | | |
| 12 | Image | Plane | — | | | |

*Reference wavelength for Focal length and Index calculation is 587.6 nm

TABLE 2

| | Aspheric Coefficients | | | |
|---|---|---|---|---|
| Surface # | 1 | 2 | 4 | 5 |
| k = | −1.00000E+00 | −1.11549E+00 | 7.51763E−01 | 2.99975E+00 |
| A4 = | 4.28170E−01 | 9.19444E−01 | 1.08689E+00 | −1.38040E+00 |
| A6 = | −5.01337E−02 | −8.32058E−01 | −9.68785E+00 | 8.70343E+00 |
| A8 = | 1.73352E−01 | 5.70327E+00 | 9.21534E+01 | −2.53567E+01 |
| A10 = | 5.91690E−01 | −1.99287E+01 | 1.30412E+02 | 2.53875E+01 |
| A12 = | | | −6.76198E+03 | 1.44434E−05 |
| A14 = | | | 2.15652E+04 | −1.65301E−05 |

| Surface # | 6 | 7 | 8 | 9 |
|---|---|---|---|---|
| k = | −1.50023E+01 | −3.51103E+00 | −2.15652E+00 | −2.87477E+00 |
| A4 = | 4.81053E−01 | −6.80537E−01 | 3.82470E−01 | 9.22438E−01 |
| A6 = | −8.13220E−01 | 1.35411E+00 | −8.38621E−01 | −1.17607E+00 |
| A8 = | 6.01955E−01 | −1.08306E+00 | 1.39116E+00 | 1.03278E+00 |
| A10 = | −4.25606E−01 | 1.36575E−01 | −6.87214E−01 | −3.31819E−01 |
| A12 = | 1.41591E−01 | 2.82026E−01 | 2.60291E−02 | −1.74510E−02 |
| A14 = | −5.27952E−02 | −7.80468E−02 | −8.56922E−03 | −3.30273E−02 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: radius of curvature;

k: the conic coefficient;

Ai: the aspheric coefficient of order i.

In the first embodiment of the present optical lens system, the focal length of the optical lens system is f, and it satisfies the following relation: f=1.69 (mm).

In the first embodiment of the present optical lens system, the f-number of the optical lens system is Fno, and it satisfies the relation: Fno=2.45.

In the first embodiment of the present optical lens system, half of the maximal field of view is HFOV, and it satisfies the relation: HFOV=36.5 deg.

In the first embodiment of the present optical lens system, an axial distance between the second lens element 120 and the third lens element 130 is T23, an axial distance between the third lens element 130 and the fourth lens element 140 is T34, a central thickness of the third lens element 130 is CT3, and they satisfy the following relation: (T23+T34)/CT3=0.13.

In the first embodiment of the present optical lens system, the focal length of the optical lens system is f, a curvature radius of the object-side surface 111 of the first lens element 110 is R1, and they satisfy the following relation: f/R1=0.82.

In the first embodiment of the present optical lens system, a curvature radius of the object-side surface 131 of the third lens element 130 is R5, a curvature radius of the image-side surface 132 of the third lens element 130 is R6, and they satisfy the following relation: (R5+R6)/(R5−R6)=0.30.

In the first embodiment of the present optical lens system, a curvature radius of the object-side surface 141 of the fourth lens element 140 is R7, a curvature radius of the image-side surface 132 of the third lens element 130 is R6, and they satisfy the following relation: R7/R6=0.63.

In the first embodiment of the present optical lens system, the focal length of the optical lens system is f, a focal length of the first lens element 110 is f1, a focal length of the second lens element 120 is f2, and they preferably satisfy the following relation: f/f1+f/f2=−0.47.

In the first embodiment of the present optical lens system, the focal length of the optical lens system is f, a focal length of the third lens element 130 is f3, and they satisfy the following relation: f/f3=2.13.

In the first embodiment of the present optical lens system, the focal length of the third lens element 130 is f3, a focal length of the fourth lens element 140 is f4, and they satisfy the following relation: f3/f4=−0.62.

In the first embodiment of the present optical lens system, half of the maximal field of view is HFOV, and it satisfies the relation: tan(HFOV)=0.74.

In the first embodiment of the present optical lens system, an angle between a vertical plane to the optical axis and a tangent plane of the image-side surface 142 of the fourth lens element 140 at the position of the farthest clear aperture radius thereof is ANG42, and it satisfies the relation: ANG42=20.0 degree.

In the first embodiment of the present optical lens system, an axial distance between the stop 100 and the image-side surface 142 of the fourth lens element 140 is SD, an axial distance between the object-side surface 111 of the first lens element 110 and the image-side surface 142 of the fourth lens element 140 is TD, and they satisfy the following relation: SD/TD=0.78.

Embodiment 2

Figure 2A:
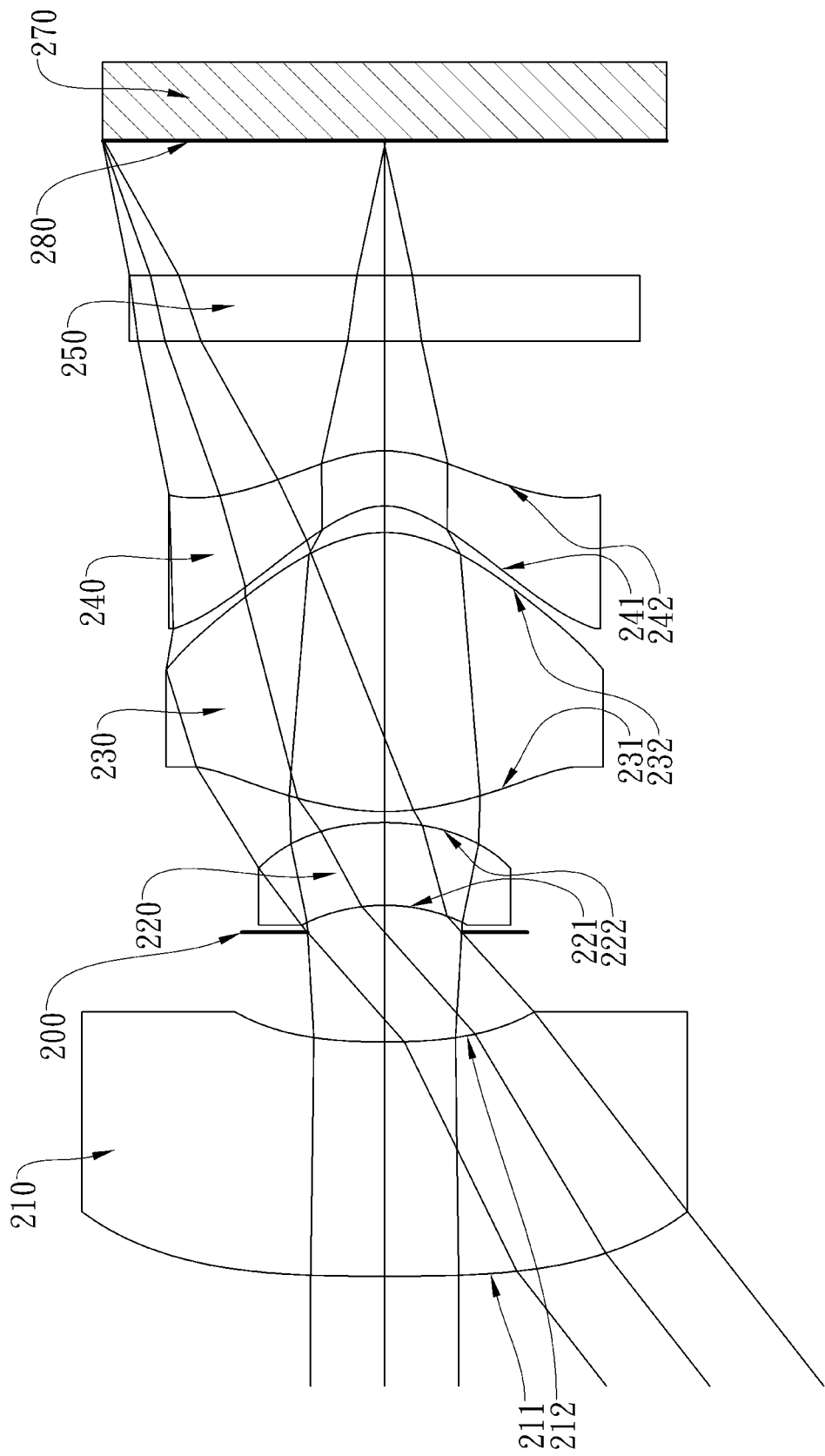
FIG. 2A shows an optical lens system in accordance with a second embodiment of the present invention.
Figure 2B:
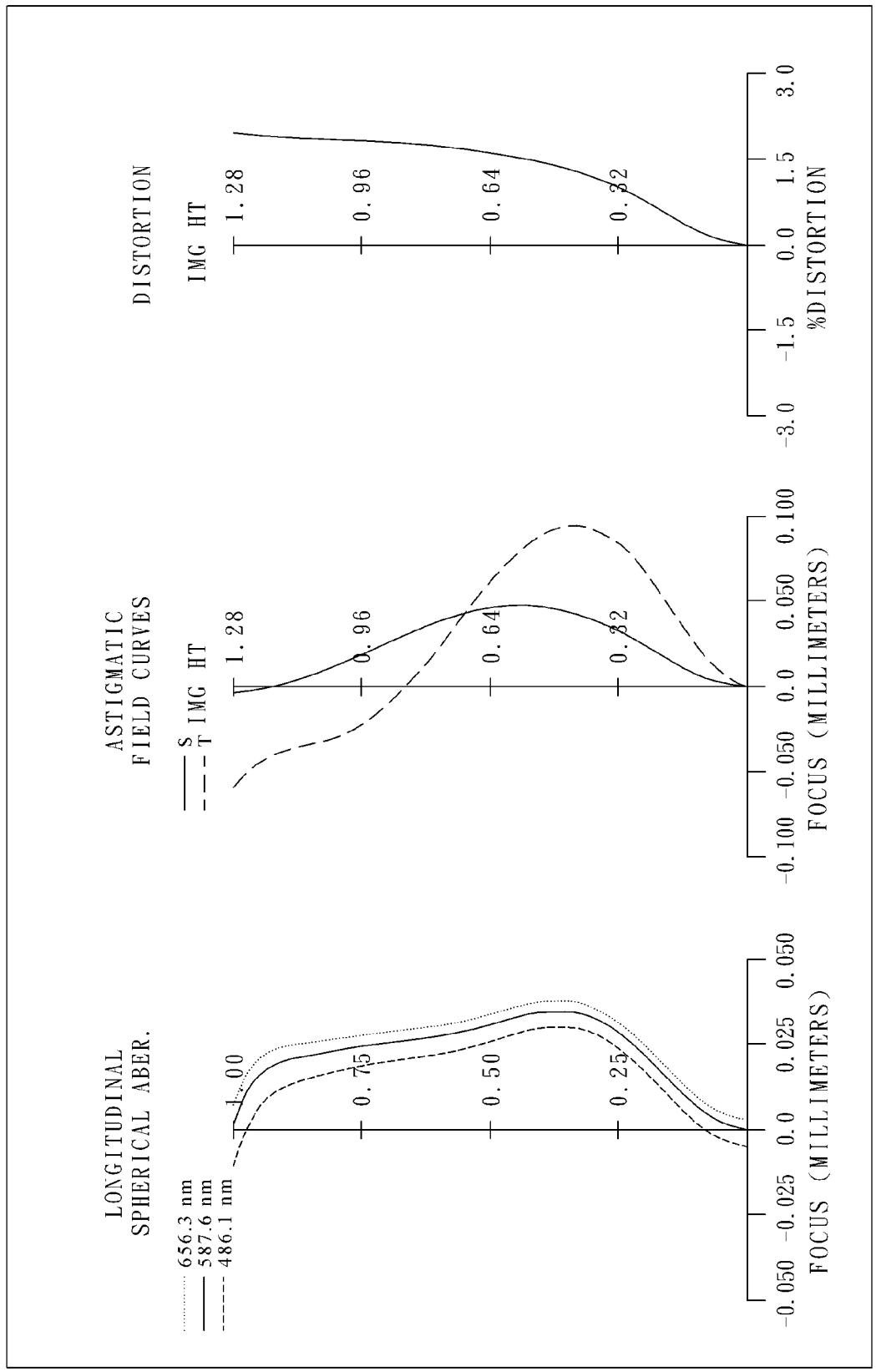
FIG. 2B shows the aberration curves of the second embodiment of the present invention.

FIG. 2A shows an optical lens system in accordance with the second embodiment of the present invention, and FIG. 2B shows the aberration curves of the second embodiment of the present invention. The optical lens system of the second embodiment of the present invention mainly comprises four lens elements, in order from an object side to an image side:

a plastic first lens element 210 with negative refractive power having a convex object-side surface 211 and a concave image-side surface 212, the object-side and image-side surfaces 211 and 212 thereof being aspheric;

a plastic second lens element 220 with negative refractive power having a concave object-side surface 221 and a convex image-side surface 222, the object-side and image-side surfaces 221 and 222 thereof being aspheric;

a plastic third lens element 230 with positive refractive power having a convex object-side surface 231 and a convex image-side surface 232, the object-side and image-side surfaces 231 and 232 thereof being aspheric; and a plastic fourth lens element 240 with negative refractive power having a concave object-side surface 241 and a convex image-side surface 242, the object-side and image-side surfaces 241 and 242 thereof being aspheric, at least one inflection point is positioned on both the object-side surface 241 and the image-side surface 242;

wherein, the shape of the image-side surface 242 of the fourth lens element 240 changes from convex when near the optical axis to concave when away from the optical axis;

wherein a stop, can be an aperture stop 200 is disposed between the first lens element 210 and the second lens element 220;

the optical lens system further comprises a filter 250 disposed between the image-side surface 242 of the fourth lens element 240 and an image plane 280; the filter 250 is an IR cut-filter made of glass and has no influence on the focal length of the optical lens system; the optical lens system further comprises an image sensor 270 provided on the image plane 280.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 1.60 mm, Fno = 2.38, HFOV = 38.0 deg.

| Surface # | | Curvature | Thickness | Material | Index | Focal Length |
|---|---|---|---|---|---|---|
| 0 | Object | Plane | Infinity | | | |
| 1 | Lens 1 | 13.175200 (ASP) | 1.069 | Plastic | 1.544 | −7.66 |
| 2 | | 3.075900 (ASP) | 0.501 | APEL-5514ML | | |
| 3 | Ape. Stop | Plane | 0.123 | | | |
| 4 | Lens 2 | −0.831920 (ASP) | 0.377 | Plastic | 1.544 | −5.31 |
| 5 | | −1.355290 (ASP) | 0.050 | APEL-5514ML | | |
| 6 | Lens 3 | 0.955140 (ASP) | 1.274 | Plastic | 1.544 | 0.90 |
| 7 | | −0.536210 (ASP) | 0.121 | APEL-5514ML | | |
| 8 | Lens 4 | −0.313280 (ASP) | 0.251 | Plastic | 1.640 | −1.50 |
| 9 | | −0.610570 (ASP) | 0.500 | SP3810 | | |
| 10 | Filter | Plane | 0.300 | Glass | 1.510 | — |
| 11 | | Plane | 0.614 | HOYA-BSC7 | | |
| 12 | Image | Plane | — | | | |

*Reference wavelength for Focal length and Index calculation is 587.6 nm

TABLE 4

Aspheric Coefficients

| Surface # | 1 | 2 | 4 | 5 |
|---|---|---|---|---|
| k = | −1.00000E+00 | −1.76196E+01 | 1.14054E+00 | 3.00000E+00 |
| A4 = | 8.47606E−02 | 4.44563E−01 | 7.80816E−01 | −1.63761E+00 |
| A6 = | −2.87744E−02 | −6.19476E−01 | −9.55657E+00 | 9.66667E+00 |
| A8 = | 1.13671E−02 | 1.47321E+00 | 8.15342E+01 | −2.84657E+01 |
| A10 = | −1.39724E−03 | −1.35922E+00 | 7.24690E+01 | 3.03931E+01 |
| A12 = | | | −4.41400E+03 | 3.67503E−05 |
| A14 = | | | 1.55605E+04 | 2.44225E−06 |

| Surface # | 6 | 7 | 8 | 9 |
|---|---|---|---|---|
| k = | −2.00000E+01 | −3.52099E+00 | −1.95683E+00 | −2.40830E+00 |
| A4 = | 4.30551E−01 | −7.12883E−01 | 3.72409E−01 | 8.09098E−01 |
| A6 = | −6.96449E−01 | 1.35476E+00 | −8.85585E−01 | −1.19319E+00 |
| A8 = | 6.14189E−01 | −1.10020E+00 | 1.33817E+00 | 1.04115E+00 |
| A10 = | −5.13730E−01 | 1.22972E−01 | −7.43768E−01 | −3.33823E−01 |

TABLE 4-continued

| Aspheric Coefficients | | | | |
|---|---|---|---|---|
| A12 = | 1.70942E−01 | 2.88448E−01 | 2.46106E−02 | −6.44923E−03 |
| A14 = | −1.24631E−02 | −1.33231E−01 | 6.83028E−02 | 6.27686E−04 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5; wherein the units of HFOV and ANG42 are expressed in degree (deg.).

TABLE 5

| (Embodiment 2) | |
|---|---|
| f [mm] | 1.60 |
| Fno | 2.38 |
| HFOV [deg.] | 38.0 |
| (T23 + T34)/CT3 | 0.13 |
| f/R1 | 0.12 |
| (R5 + R6)/(R5 − R6) | 0.28 |
| R7/R6 | 0.58 |
| f/f1 + f/f2 | −0.51 |
| f/f3 | 1.78 |
| f3/f4 | −0.62 |
| tan(HFOV) | 0.78 |
| ANG42 [deg.] | 12.6 |
| SD/TD | 0.58 |

Embodiment 3

Figure 3A:
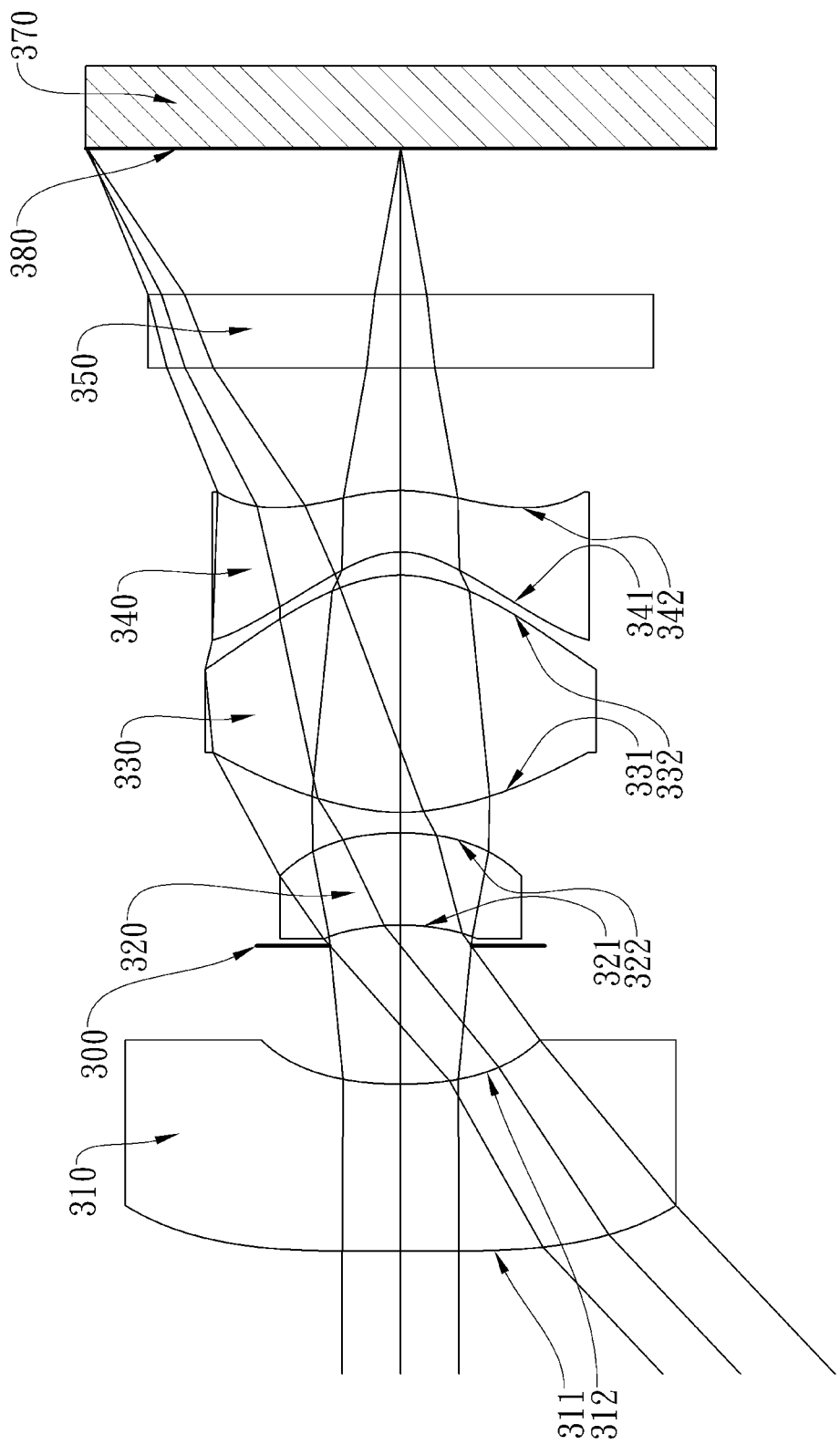
FIG. 3A shows an optical lens system in accordance with a third embodiment of the present invention.
Figure 3B:
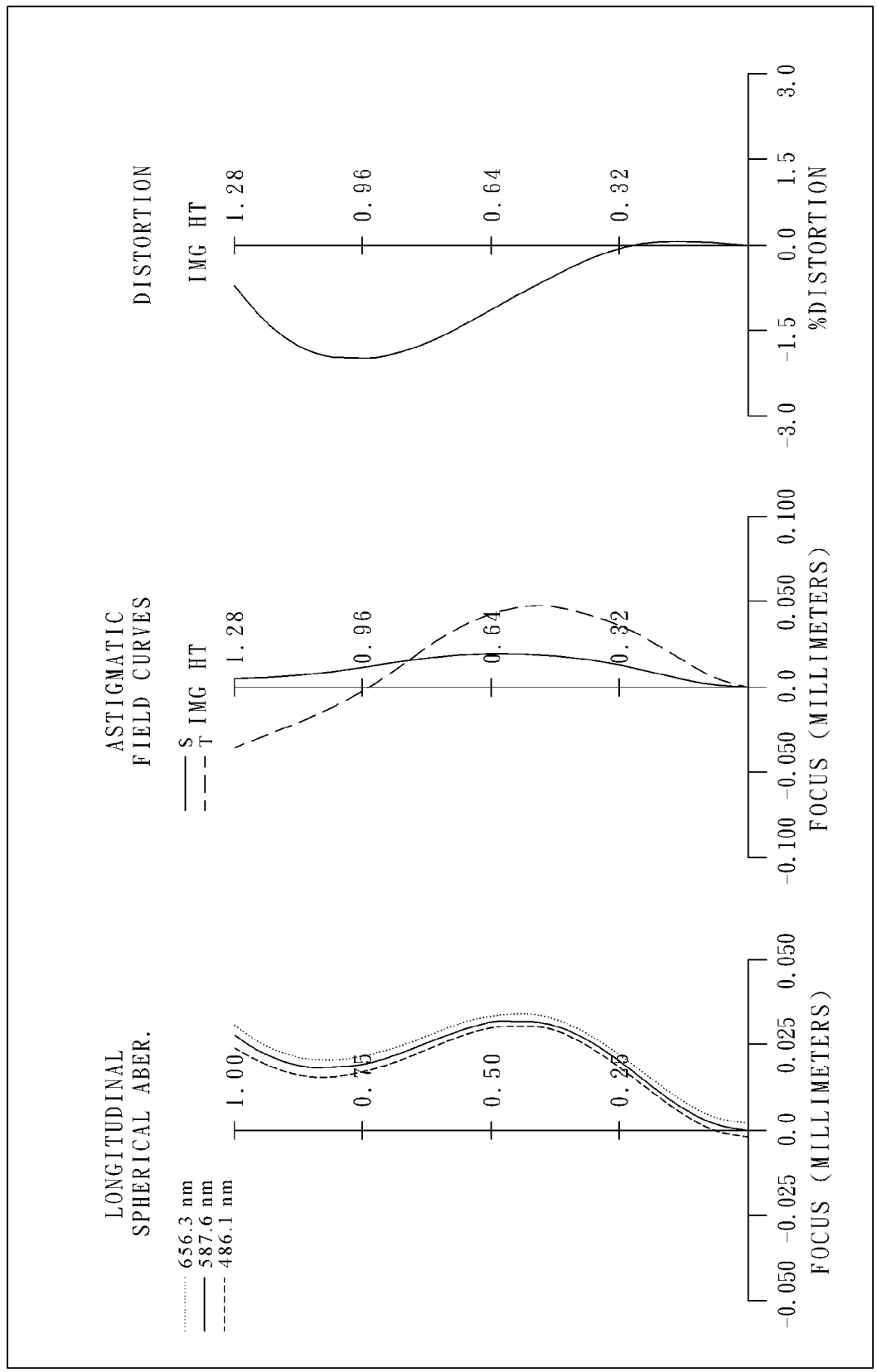
FIG. 3B shows the aberration curves of the third embodiment of the present invention.

FIG. 3A shows an optical lens system in accordance with the third embodiment of the present invention, and FIG. 3B shows the aberration curves of the third embodiment of the present invention. The optical lens system of the third embodiment of the present invention mainly comprises four lens elements, in order from an object side to an image side:

a plastic first lens element 310 with negative refractive power having a convex object-side surface 311 and a concave image-side surface 312, the object-side and image-side surfaces 311 and 312 thereof being aspheric;

a plastic second lens element 320 with negative refractive power having a concave object-side surface 321 and a convex image-side surface 322, the object-side and image-side surfaces 321 and 322 thereof being aspheric;

a plastic third lens element 330 with positive refractive power having a convex object-side surface 331 and a convex image-side surface 332, the object-side and image-side surfaces 331 and 332 thereof being aspheric; and a plastic fourth lens element 340 with negative refractive power having a concave object-side surface 341 and a convex image-side surface 342, the object-side and image-side surfaces 341 and 342 thereof being aspheric, at least one inflection point is positioned on both the object-side surface 341 and the image-side surface 342;

wherein, the shape of the image-side surface 342 of the fourth lens element 340 changes from convex when near the optical axis to concave when away from the optical axis;

wherein a stop, can be an aperture stop 300 is disposed between the first lens element 310 and the second lens element 320;

the optical lens system further comprises a filter 350 disposed between the image-side surface 342 of the fourth lens element 340 and an image plane 380; the filter 350 is an IR cut-filter made of glass and has no influence on the focal length of the optical lens system; the optical lens system further comprises an image sensor 370 provided on the image plane 380.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 1.36 mm, Fno = 2.85, HFOV = 43.4 deg.

| Surface # | | Curvature | Thickness | Material | Index | Focal Length |
|---|---|---|---|---|---|---|
| 0 | Object | Plane | Infinity | | | |
| 1 | Lens 1 | 100.000000 (ASP) | 0.682 | Plastic | 1.544 | −2.75 |
| 2 | | 1.470480 (ASP) | 0.564 | APEL-5514ML | | |
| 3 | Ape. Stop | Plane | 0.085 | | | |
| 4 | Lens 2 | −1.031210 (ASP) | 0.376 | Plastic | 1.544 | −38.74 |
| 5 | | −1.223570 (ASP) | 0.084 | APEL-5514ML | | |
| 6 | Lens 3 | 0.807980 (ASP) | 0.968 | Plastic | 1.544 | 0.79 |
| 7 | | −0.534470 (ASP) | 0.095 | APEL-5514ML | | |
| 8 | Lens 4 | −0.319110 (ASP) | 0.250 | Plastic | 1.634 | −1.15 |
| 9 | | −0.739980 (ASP) | 0.500 | EP5000 | | |
| 10 | Filter | Plane | 0.300 | Glass | 1.510 | — |
| 11 | | Plane | 0.595 | HOYA-BSC7 | | |
| 12 | Image | Plane | — | | | |

*Reference wavelength for Focal length and Index calculation is 587.6 nm

TABLE 7

| | Aspheric Coefficients | | | |
|---|---|---|---|---|
| Surface # | 1 | 2 | 4 | 5 |
| k = | −1.00000E+00 | −1.45921E+01 | 2.94863E+00 | 3.99603E+00 |
| A4 = | 1.57500E−01 | 9.58758E−01 | −1.73137E−01 | −1.96404E+00 |
| A6 = | −6.25965E−02 | −1.61816E−01 | −2.99541E+00 | 1.11168E+01 |
| A8 = | 2.31072E−02 | −7.57818E−01 | 7.26457E+01 | −3.63460E+01 |
| A10 = | −8.02425E−04 | 4.24978E+00 | −6.98583E+02 | 5.32398E+01 |
| A12 = | | | 1.81296E+03 | 2.51268E−05 |
| A14 = | | | 2.34827E−04 | −3.94178E−06 |
| Surface # | 6 | 7 | 8 | 9 |
| k = | −1.19591E+01 | −4.37508E+00 | −2.55756E+00 | −5.92292E+00 |
| A4 = | 4.94538E−01 | −7.28497E−01 | 3.99508E−01 | 1.04058E+00 |
| A6 = | −7.05295E−01 | 1.42118E+00 | −8.73360E−01 | −1.16197E+00 |
| A8 = | 6.57371E−01 | −1.08025E+00 | 1.38640E+00 | 1.10684E+00 |
| A10 = | −5.07122E−01 | 8.61537E−02 | −6.56823E−01 | −2.96775E−01 |
| A12 = | 1.37441E−01 | 2.25438E−01 | 5.25465E−02 | −1.68976E−02 |
| A14 = | −1.77621E−02 | 7.13164E−04 | 1.22760E−02 | −2.20876E−05 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8; wherein the units of HFOV and ANG42 are expressed in degree (deg.).

TABLE 8

| (Embodiment 3) | |
|---|---|
| f [mm] | 1.36 |
| Fno | 2.85 |
| HFOV [deg.] | 43.4 |
| (T23 + T34)/CT3 | 0.18 |
| f/R1 | 0.01 |
| (R5 + R6)/(R5 − R6) | 0.20 |
| R7/R6 | 0.60 |
| f/f1 + f/f2 | −0.53 |
| f/f3 | 1.71 |
| f3/f4 | −0.69 |
| tan(HFOV) | 0.95 |
| ANG42 [deg.] | 32.0 |
| SD/TD | 0.60 |

Embodiment 4

Figure 4A:
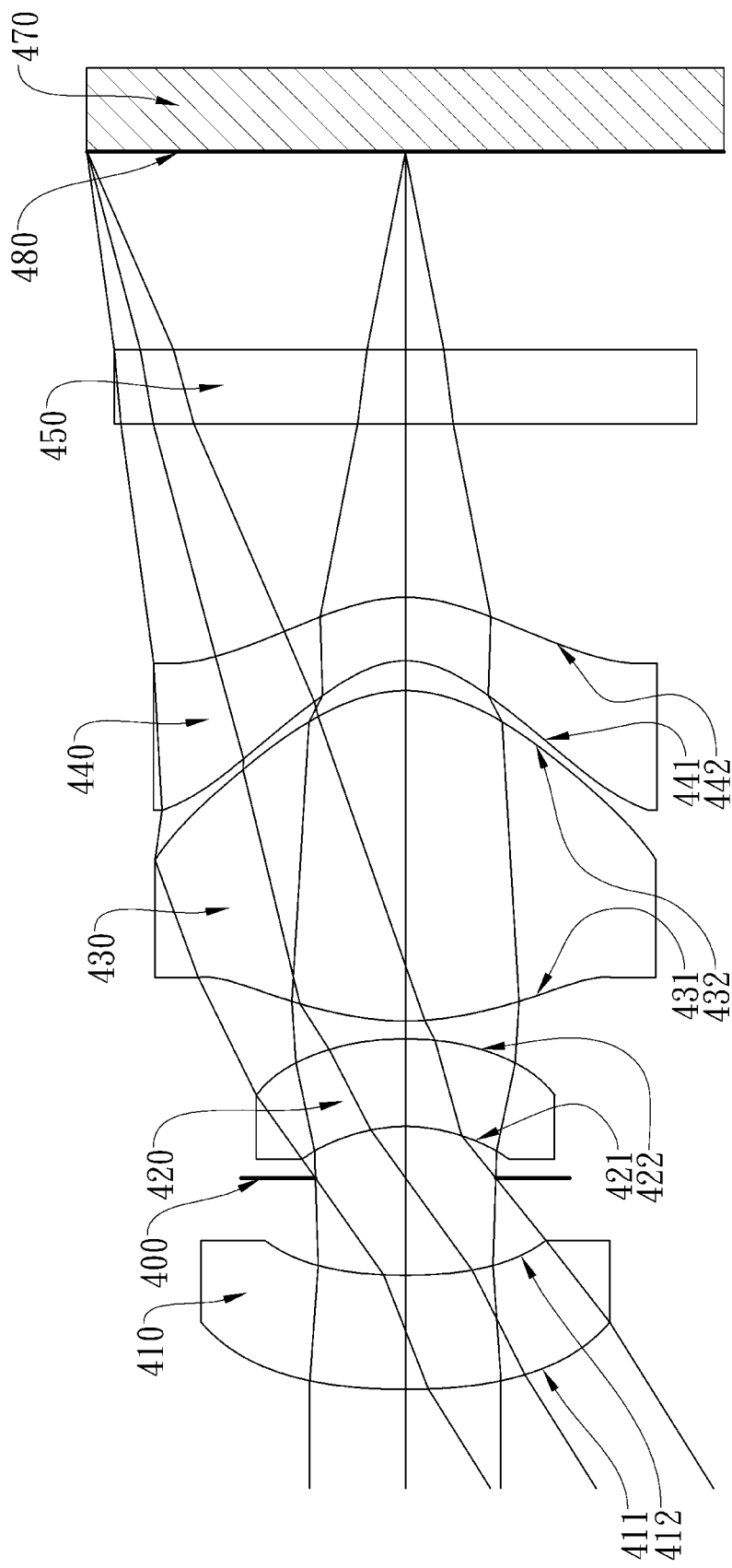
FIG. 4A shows an optical lens system in accordance with a fourth embodiment of the present invention.
Figure 4B:
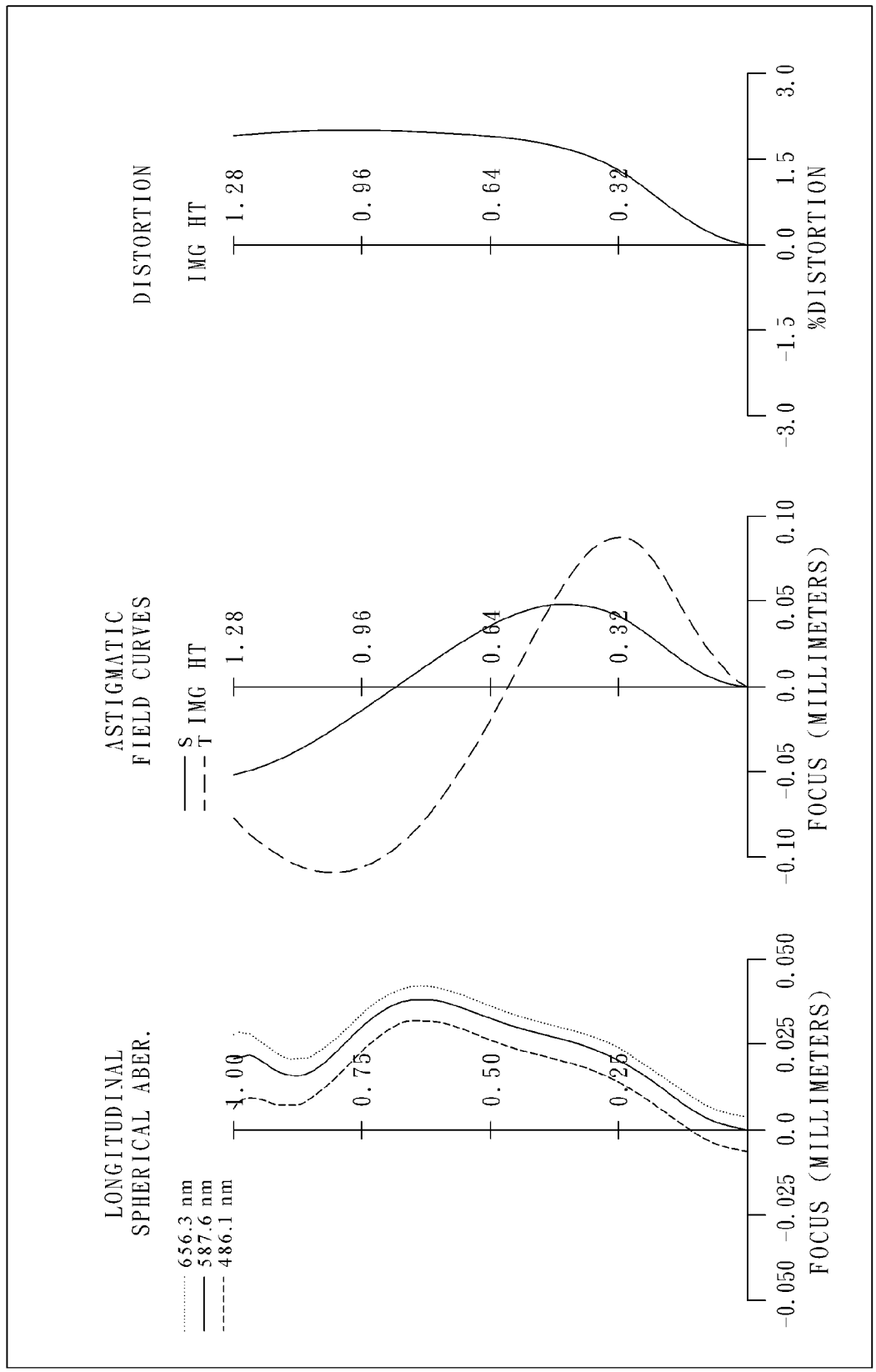
FIG. 4B shows the aberration curves of the fourth embodiment of the present invention.

FIG. 4A shows an optical lens system in accordance with the fourth embodiment of the present invention, and FIG. 4B shows the aberration curves of the fourth embodiment of the present invention. The optical lens system of the fourth embodiment of the present invention mainly comprises four lens elements, in order from an object side to an image side:

a plastic first lens element 410 with negative refractive power having a convex object-side surface 411 and a concave image-side surface 412, the object-side and image-side surfaces 411 and 412 thereof being aspheric;

a plastic second lens element 420 with negative refractive power having a concave object-side surface 421 and a convex image-side surface 422, the object-side and image-side surfaces 421 and 422 thereof being aspheric;

a plastic third lens element 430 with positive refractive power having a convex object-side surface 431 and a convex image-side surface 432, the object-side and image-side surfaces 431 and 432 thereof being aspheric; and a plastic fourth lens element 440 with negative refractive power having a concave object-side surface 441 and a convex image-side surface 442, the object-side and image-side surfaces 441 and 442 thereof being aspheric, at least one inflection point is positioned on both the object-side surface 441 and the image-side surface 442;

wherein, the shape of the image-side surface 442 of the fourth lens element 440 changes from convex when near the optical axis to concave when away from the optical axis;

wherein a stop, can be an aperture stop 400 is disposed between the first lens element 410 and the second lens element 420;

the optical lens system further comprises a filter 450 disposed between the image-side surface 442 of the fourth lens element 440 and an image plane 480; the filter 450 is an IR cut-filter made of glass and has no influence on the focal length of the optical lens system; the optical lens system further comprises an image sensor 470 provided on the image plane 480.

The detailed optical data of the fourth embodiment is shown in TABLE 9, and the aspheric surface data is shown in TABLE 10 wherein the units of the radius of curvature, the thickness and the focal length are expressed in mm, and HFOV is half of the maximal field of view.

TABLE 9

| (Embodiment 4) f = 2.01 mm, Fno = 2.60, HFOV = 32.0 deg. | | | | | | |
|---|---|---|---|---|---|---|
| Surface # | | Curvature | Thickness | Material | Index | Focal Length |
| 0 | Object | Plane | Infinity | | | |
| 1 | Lens 1 | 2.556350 (ASP) | 0.461 | Plastic | 1.514 | −26.79 |
| 2 | | 2.023930 (ASP) | 0.393 | ARTON-D4532 | | |
| 3 | Ape. Stop | Plane | 0.208 | | | |

TABLE 9-continued (Embodiment 4)
f = 2.01 mm, Fno = 2.60, HFOV = 32.0 deg.

| Surface # | | Curvature | Thickness | Material | Index | Focal Length |
|---|---|---|---|---|---|---|
| 4 | Lens 2 | −0.680710 (ASP) | 0.354 | Plastic | 1.514 | −3.31 |
| 5 | | −1.336950 (ASP) | 0.072 | ARTON-D4532 | | |
| 6 | Lens 3 | 1.002850 (ASP) | 1.335 | Plastic | 1.514 | 0.97 |
| 7 | | −0.538380 (ASP) | 0.121 | ARTON-D4532 | | |
| 8 | Lens 4 | −0.329860 (ASP) | 0.256 | Plastic | 1.614 | −1.64 |
| 9 | | −0.634690 (ASP) | 0.700 | SP1516 | | |
| 10 | Filter | Plane | 0.300 | Glass | 1.510 | — |
| 11 | | Plane | 0.801 | HOYA-BSC7 | | |
| 12 | Image | Plane | — | | | |

*Reference wavelength for Focal length and Index calculation is 587.6 nm

TABLE 10

| Aspheric Coefficients | | | | |
|---|---|---|---|---|
| Surface # | 1 | 2 | 4 | 5 |
| k = | −1.00000E+00 | −6.20387E+00 | 1.01424E+00 | 2.93717E+00 |
| A4 = | 2.81841E−01 | 7.41360E−01 | 1.39805E+00 | −1.21748E+00 |
| A6 = | −1.50838E−01 | −1.44113E+00 | −1.02468E+01 | 8.24070E+00 |
| A8 = | 2.25125E−01 | 5.99063E+00 | 8.80428E+01 | −2.38503E+01 |
| A10 = | 4.22358E−02 | −7.40756E+00 | 3.23045E+02 | 2.23631E+01 |
| A12 = | | | −6.20249E+03 | 1.32650E−05 |
| A14 = | | | 1.88484E+04 | −1.70643E−05 |
| Surface # | 6 | 7 | 8 | 9 |
| k = | −1.87903E+01 | −3.41388E+00 | −1.83308E+00 | −1.75288E+00 |
| A4 = | 4.50184E−01 | −7.33321E−01 | 3.35329E−01 | 8.20254E−01 |
| A6 = | −7.78057E−01 | 1.31878E+00 | −9.01262E−01 | −1.19338E+00 |
| A8 = | 6.24026E−01 | −1.07722E+00 | 1.34859E+00 | 1.01514E+00 |
| A10 = | −4.35886E−01 | 1.57237E−01 | −6.94410E−01 | −3.22689E−01 |
| A12 = | 4.05195E−02 | 2.79600E−01 | 4.35881E−02 | 5.16663E−03 |
| A14 = | −1.08629E−01 | −1.52971E−01 | 2.64527E−02 | −6.26455E−03 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11; wherein the units of HFOV and ANG42 are expressed in degree (deg.).

TABLE 11

| (Embodiment 4) | | | |
|---|---|---|---|
| f [mm] | 2.01 | f/f1 + f/f2 | −0.68 |
| Fno | 2.60 | f/f3 | 2.08 |
| HFOV [deg.] | 32.0 | f3/f4 | −0.59 |
| (T23 + T34)/CT3 | 0.14 | tan(HFOV) | 0.62 |
| f/R1 | 0.79 | ANG42 [deg.] | 4.2 |
| (R5 + R6)/(R5 − R6) | 0.30 | SD/TD | 0.73 |
| R7/R6 | 0.61 | | |

Embodiment 5

Figure 5A:
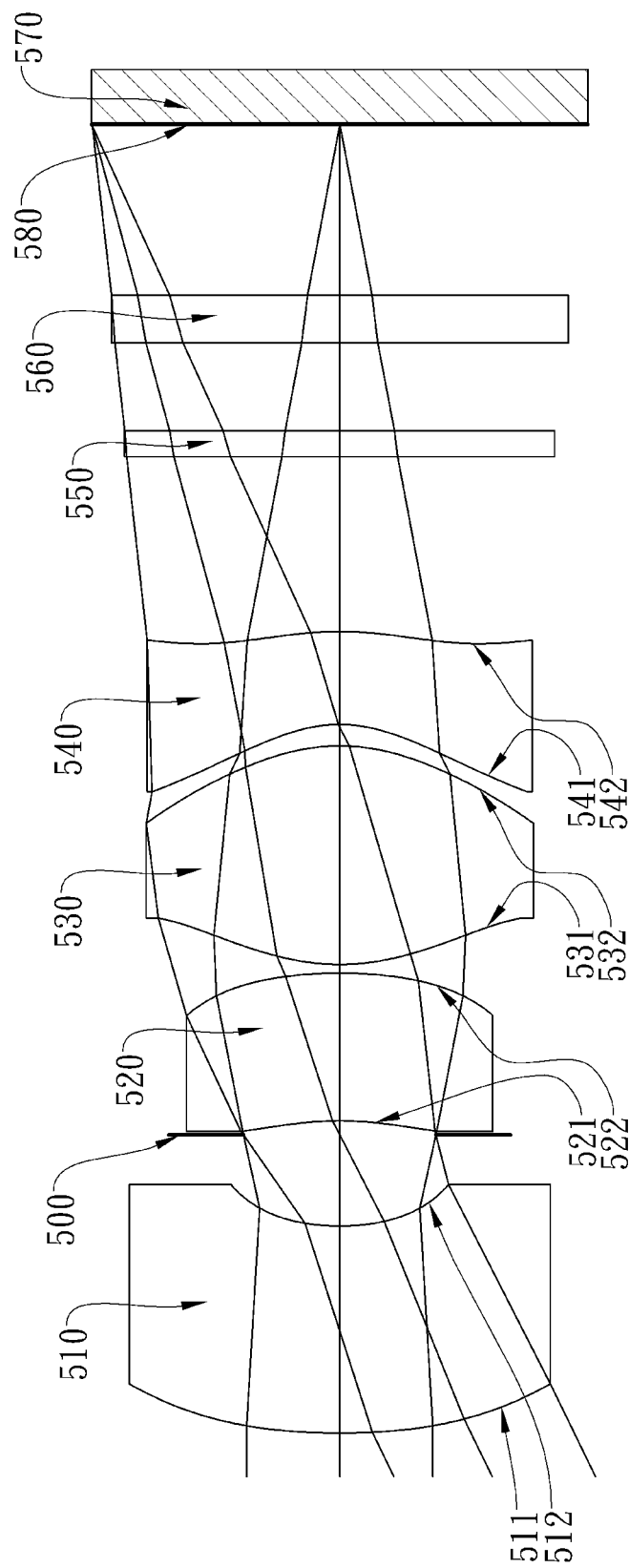
FIG. 5A shows an optical lens system in accordance with a fifth embodiment of the present invention.
Figure 5B:
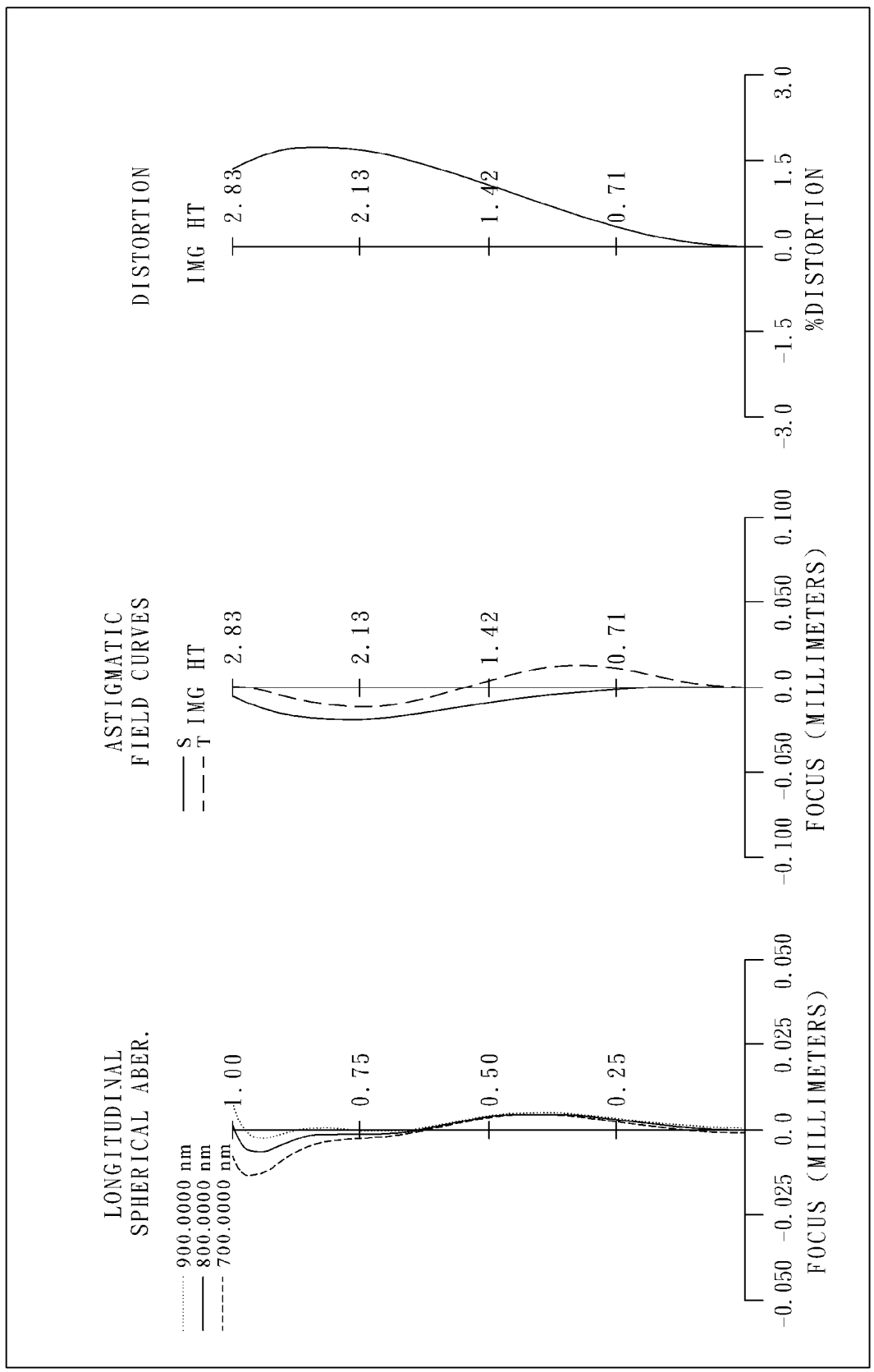
FIG. 5B shows the aberration curves of the fifth embodiment of the present invention.

FIG. 5A shows an optical lens system in accordance with the fifth embodiment of the present invention, and FIG. 5B shows the aberration curves of the fifth embodiment of the present invention. The optical lens system of the fifth embodiment of the present invention mainly comprises four lens elements, in order from an object side to an image side:

a plastic first lens element 510 with negative refractive power having a convex object-side surface 511 and a concave image-side surface 512, the object-side and image-side surfaces 511 and 512 thereof being aspheric;

a plastic second lens element 520 with negative refractive power having a concave object-side surface 521 and a convex image-side surface 522, the object-side and image-side surfaces 521 and 522 thereof being aspheric;

a plastic third lens element 530 with positive refractive power having a convex object-side surface 531 and a convex image-side surface 532, the object-side and image-side surfaces 531 and 532 thereof being aspheric; and a plastic fourth lens element 540 with negative refractive power having a concave object-side surface 541 and a convex image-side surface 542, the object-side and image-side surfaces 541 and 542 thereof being aspheric, at least one inflection point is positioned on both the object-side surface 541 and the image-side surface 542;

wherein, the shape of the image-side surface 542 of the fourth lens element 540 changes from convex when near the optical axis to concave when away from the optical axis;

wherein a stop, can be an aperture stop 500 is disposed between the first lens element 510 and the second lens element 520;

the optical lens system further comprises a filter 550 disposed between the image-side surface 542 of the fourth lens element 540 and a cover glass 560; the filter 550 is an IR pass-filter made of glass and has no influence on the focal length of the optical lens system; the optical lens system further comprises an image sensor 570 provided on an image plane 580.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 5.74 mm, Fno = 2.70, HFOV = 26.0 deg.

| Surface # | | Curvature | Thickness | Material | Index | Focal Length |
|---|---|---|---|---|---|---|
| 0 | Object | Plane | Infinity | | | |
| 1 | Lens 1 | 7.500800 (ASP) | 2.369 | Plastic | 1.524 | −9.29 |
| 2 | | 2.630810 (ASP) | 1.041 | E48R25 | | |
| 3 | Ape. Stop | Plane | 0.161 | | | |
| 4 | Lens 2 | −3.608100 (ASP) | 1.690 | Plastic | 1.524 | −36.14 |
| 5 | | −5.175900 (ASP) | 0.100 | E48R25 | | |
| 6 | Lens 3 | 2.553170 (ASP) | 2.500 | Plastic | 1.524 | 2.75 |
| 7 | | −2.185600 (ASP) | 0.244 | E48R25 | | |
| 8 | Lens 4 | −1.593240 (ASP) | 1.062 | Plastic | 1.616 | −5.18 |
| 9 | | −3.995300 (ASP) | 2.000 | OKP4HT | | |
| 10 | Filter | Plane | 0.300 | Glass | 1.510 | — |
| 11 | | Plane | 1.000 | HOYA-BSC7 | | |
| 12 | Cover Glass | Plane | 0.550 | Glass | 1.510 | — |
| 13 | | Plane | 1.951 | HOYA-BSC7 | | |
| 14 | Image | Plane | — | | | |

*Reference wavelength for Focal length and Index calculation is 800.0 nm

TABLE 13

Aspheric Coefficients

| | Surface # | | | | | | | |
|---|---|---|---|---|---|---|---|---|
| | 1 | 2 | 4 | 5 | 6 | 7 | 8 | 9 |
| k = | −6.05593E+00 | −6.42055E+00 | −6.75502E−01 | −7.85324E+00 | −1.33578E+00 | −2.68525E+00 | −1.97141E+00 | −7.61229E+00 |
| A4 = | 8.69184E−03 | 9.32657E−02 | 4.97678E−02 | −1.76382E−02 | −1.73398E−02 | −1.82812E−03 | 2.77164E−02 | 2.02439E−02 |
| A6 = | −4.42007E−04 | −5.64444E−03 | −1.99467E−02 | −3.45383E−03 | 2.71893E−03 | 1.46483E−03 | −3.73850E−03 | 6.02738E−04 |
| A8 = | 2.57541E−05 | 6.79312E−03 | 1.94802E−02 | 1.90180E−03 | −6.60107E−04 | −5.47915E−04 | 1.11870E−04 | −4.77163E−04 |
| A10 = | −2.64866E−06 | −2.95100E−04 | −2.05296E−02 | −1.07580E−03 | 3.91233E−05 | 5.14116E−05 | 2.67559E−05 | 1.52650E−05 |
| A12 = | | | 1.22684E−02 | 2.81804E−04 | | | −1.44567E−06 | 1.90910E−06 |
| A14 = | | | −2.95526E−03 | −3.06855E−05 | | | | |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14; wherein the units of HFOV and ANG42 are expressed in degree (deg.).

TABLE 14

(Embodiment 5)

| f [mm] | 5.74 | f/f1 + f/f2 | −0.78 |
|---|---|---|---|
| Fno | 2.70 | f/f3 | 2.09 |
| HFOV [deg.] | 26.0 | f3/f4 | −0.53 |
| (T23 + T34)/CT3 | 0.14 | tan(HFOV) | 0.49 |
| f/R1 | 0.77 | ANG42 [deg.] | 5.5 |
| (R5 + R6)/(R5 − R6) | 0.08 | SD/TD | 0.63 |
| R7/R6 | 0.73 | | |

Embodiment 6

Figure 6A:
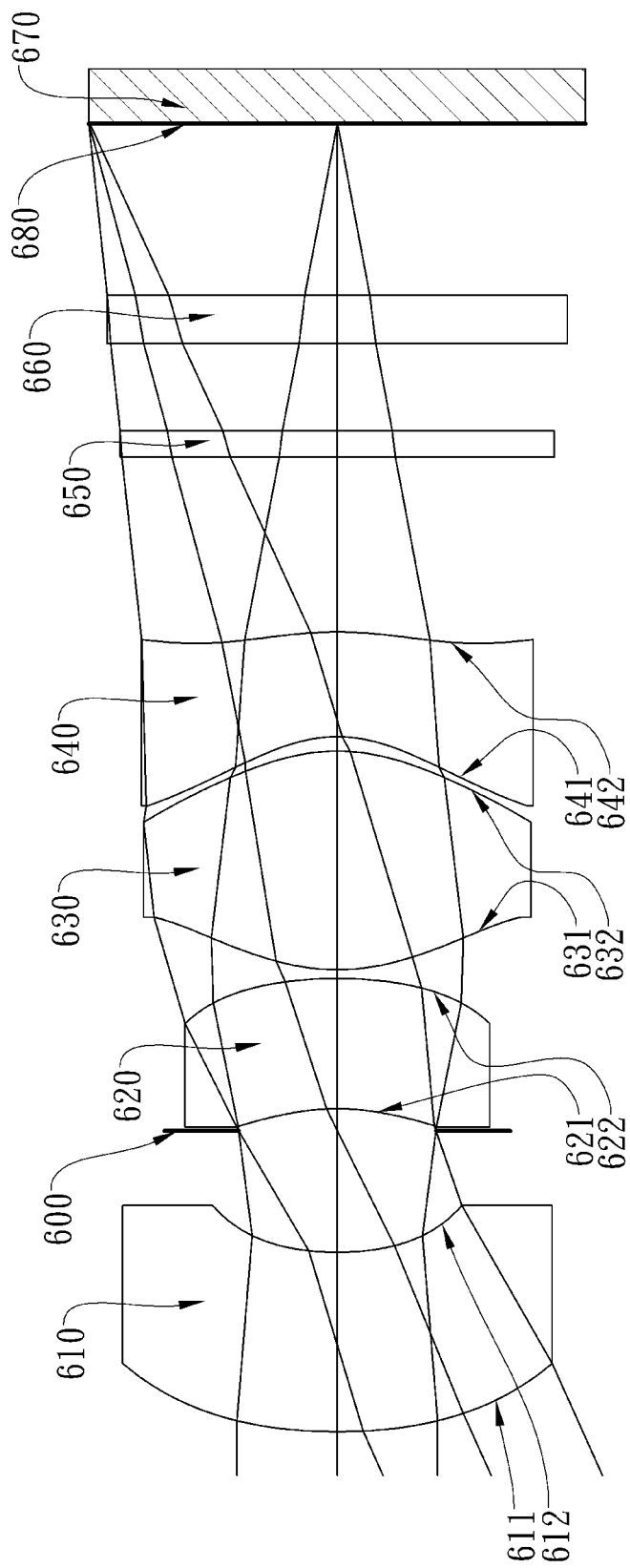
FIG. 6A shows an optical lens system in accordance with a sixth embodiment of the present invention.
Figure 6B:
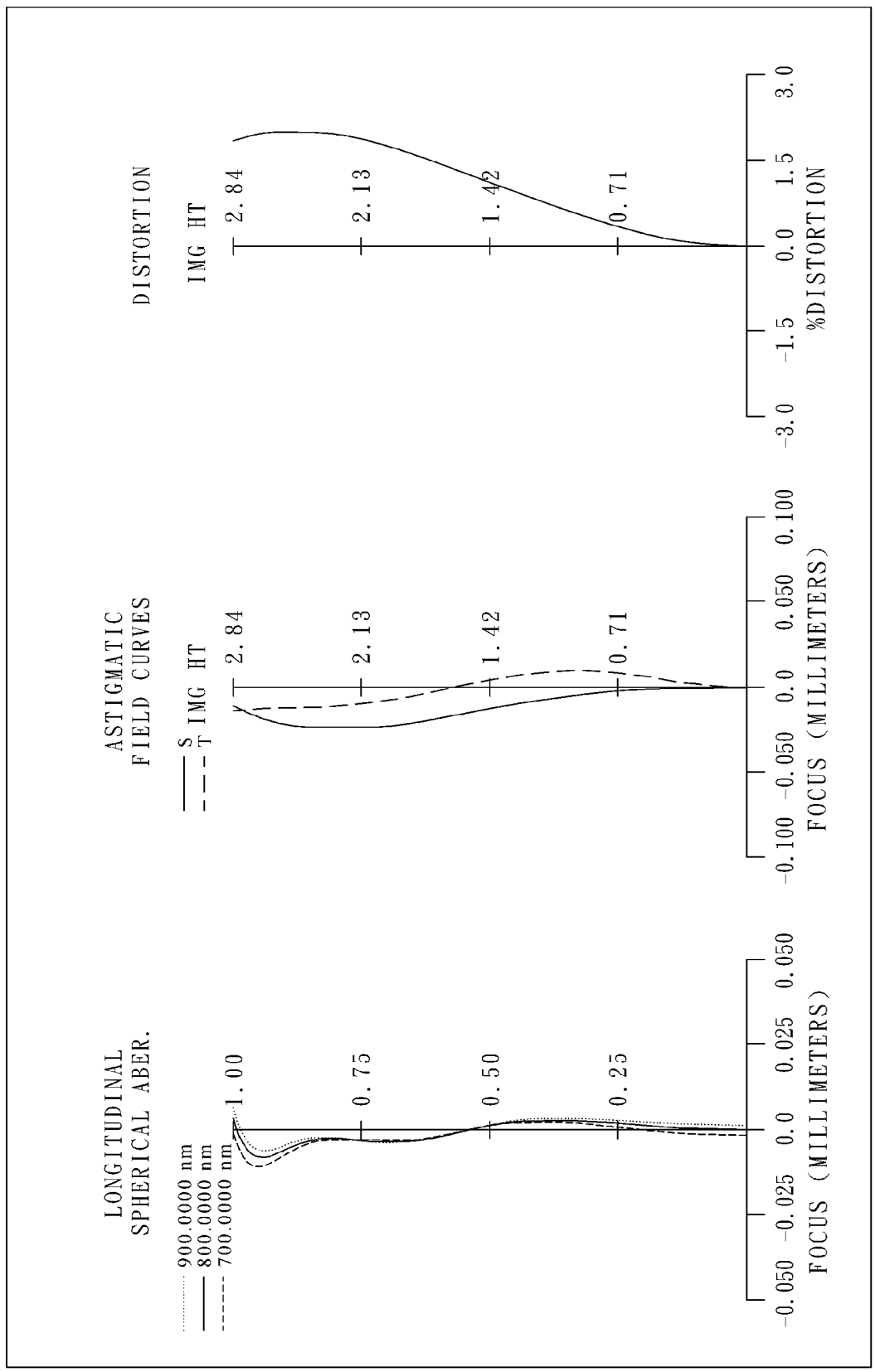
FIG. 6B shows the aberration curves of the sixth embodiment of the present invention.

FIG. 6A shows an optical lens system in accordance with the sixth embodiment of the present invention, and FIG. 6B shows the aberration curves of the sixth embodiment of the present invention. The optical lens system of the sixth embodiment of the present invention mainly comprises four lens elements, in order from an object side to an image side:

a plastic first lens element 610 with negative refractive power having a convex object-side surface 611 and a concave image-side surface 612, the object-side and image-side surfaces 611 and 612 thereof being aspheric;

a plastic second lens element 620 with negative refractive power having a concave object-side surface 621 and a convex image-side surface 622, the object-side and image-side surfaces 621 and 622 thereof being aspheric;

a plastic third lens element 630 with positive refractive power having a convex object-side surface 631 and a convex image-side surface 632, the object-side and image-side surfaces 631 and 632 thereof being aspheric; and a plastic fourth lens element 640 with negative refractive power having a concave object-side surface 641 and a convex image-side surface 642, the object-side and image-side surfaces 641 and 642 thereof being aspheric, at least one inflection point is positioned on both the object-side surface 641 and the image-side surface 642;

wherein, the shape of the image-side surface 642 of the fourth lens element 640 changes from convex when near the optical axis to concave when away from the optical axis;

wherein a stop, can be an aperture stop 600 is disposed between the first lens element 610 and the second lens element 620;

the optical lens system further comprises a filter 650 disposed between the image-side surface 642 of the fourth lens element 640 and a cover glass 660; the filter 650 is an IR pass-filter made of glass and has no influence on the focal length of the optical lens system; the optical lens system further comprises an image sensor 670 provided on an image plane 680.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 17

(Embodiment 6)

| f [mm] | 6.19 | f/f1 + f/f2 | −0.80 |
|---|---|---|---|
| Fno | 2.70 | f/f3 | 2.32 |
| HFOV [deg.] | 24.2 | f3/f4 | −0.55 |
| (T23 + T34)/CT3 | 0.11 | tan(HFOV) | 0.45 |
| f/R1 | 1.07 | ANG42 [deg.] | 5.9 |
| (R5 + R6)/(R5 − R6) | 0.04 | SD/TD | 0.62 |
| R7/R6 | 0.72 | | |

Embodiment 7

Figure 7A:
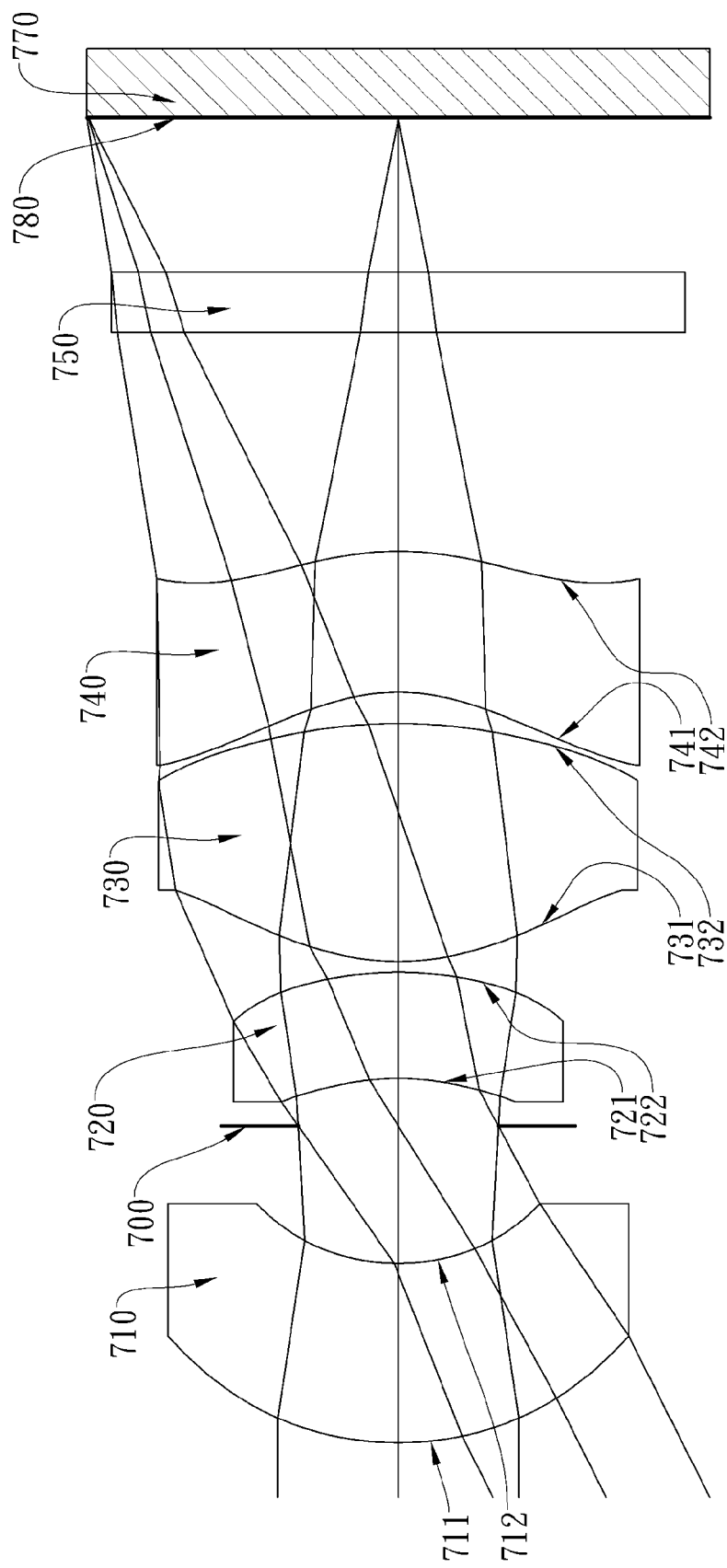
FIG. 7A shows an optical lens system in accordance with a seventh embodiment of the present invention.
Figure 7B:
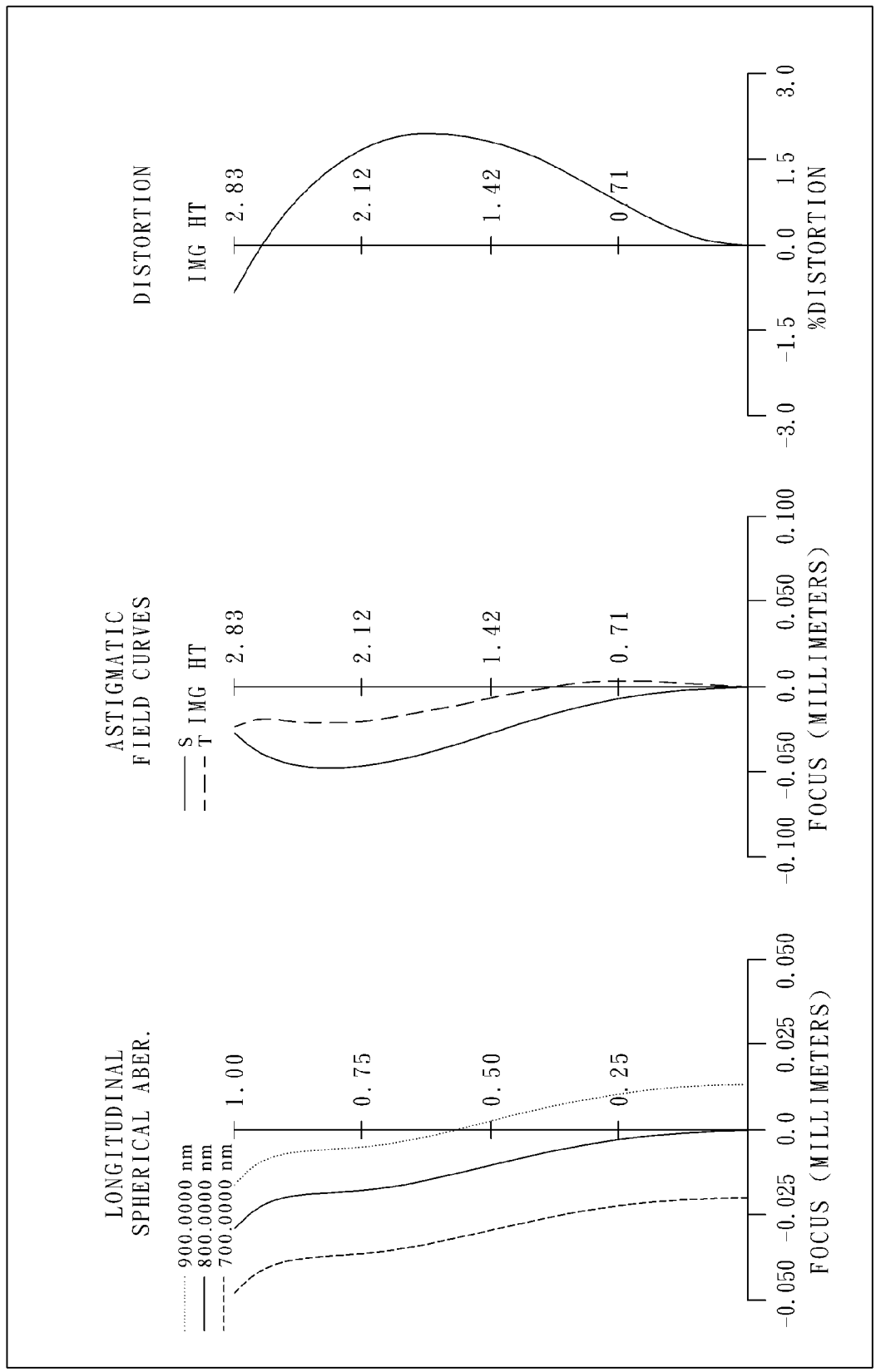
FIG. 7B shows the aberration curves of the seventh embodiment of the present invention.

FIG. 7A shows an optical lens system in accordance with the seventh embodiment of the present invention, and FIG. 7B shows the aberration curves of the seventh embodiment of the present invention. The optical lens system of the seventh

TABLE 15

(Embodiment 6)
f = 6.19 mm, Fno = 2.70, HFOV = 24.2 deg.

| Surface # | | Curvature | Thickness | Material | Index | Focal Length |
|---|---|---|---|---|---|---|
| 0 | Object | Plane | Infinity | | | |
| 1 | Lens 1 | 5.807600 (ASP) | 2.052 | Plastic | 1.524 | −16.86 |
| 2 | | 3.077900 (ASP) | 1.391 | E48R25 | | |
| 3 | Ape. Stop | Plane | 0.252 | | | |
| 4 | Lens 2 | −2.587580 (ASP) | 1.490 | Plastic | 1.524 | −14.44 |
| 5 | | −4.712900 (ASP) | 0.100 | E48R25 | | |
| 6 | Lens 3 | 2.372850 (ASP) | 2.500 | Plastic | 1.524 | 2.67 |
| 7 | | −2.174970 (ASP) | 0.165 | E48R25 | | |
| 8 | Lens 4 | −1.566320 (ASP) | 1.197 | Plastic | 1.593 | −4.87 |
| 9 | | −4.402500 (ASP) | 2.000 | SD1414 | | |
| 10 | Filter | Plane | 0.300 | Glass | 1.510 | — |
| 11 | | Plane | 1.000 | HOYA-BSC7 | | |
| 12 | Cover Glass | Plane | 0.550 | Glass | 1.510 | — |
| 13 | | Plane | 1.963 | HOYA-BSC7 | | |
| 14 | Image | Plane | — | | | |

*Reference wavelength for Focal length and Index calculation is 800.0 nm

TABLE 16

Aspheric Coefficients

| | Surface # | | | | | | | |
|---|---|---|---|---|---|---|---|---|
| | 1 | 2 | 4 | 5 | 6 | 7 | 8 | 9 |
| k = | −4.95546E+00 | −1.00000E+01 | −1.04599E+00 | −1.00000E+01 | −1.44780E+00 | −2.46197E+00 | −1.82791E+00 | −9.23184E+00 |
| A4 = | 1.02174E−02 | 7.63173E−02 | 4.88759E−02 | −1.92121E−02 | −1.71590E−02 | 2.34147E−03 | 2.70212E−02 | 1.70206E−02 |
| A6 = | −3.01884E−04 | −1.21387E−02 | −2.79226E−02 | −4.16144E−03 | 3.20644E−03 | 1.87373E−03 | −3.11978E−03 | 6.56230E−04 |
| A8 = | 3.74596E−05 | 6.85397E−03 | 2.18581E−02 | 2.04234E−03 | −6.81810E−04 | −6.24308E−04 | 1.89407E−04 | −4.13177E−04 |
| A10 = | −2.77836E−06 | −1.00465E−03 | −2.15092E−02 | −1.06590E−03 | 3.41723E−05 | 4.95997E−05 | −2.10725E−06 | 2.38842E−05 |
| A12 = | | | 1.22684E−02 | 2.67127E−04 | | | | |
| A14 = | | | −2.95526E−03 | −3.09590E−05 | | | | |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17; wherein the units of HFOV and ANG42 are expressed in degree (deg.).

embodiment of the present invention mainly comprises four lens elements, in order from an object side to an image side:

a plastic first lens element 710 with negative refractive power having a convex object-side surface 711 and a concave image-side surface 712, the object-side and image-side surfaces 711 and 712 thereof being aspheric;

a plastic second lens element 720 with negative refractive power having a concave object-side surface 721 and a convex image-side surface 722, the object-side and image-side surfaces 721 and 722 thereof being aspheric;

a plastic third lens element 730 with positive refractive power having a convex object-side surface 731 and a convex image-side surface 732, the object-side and image-side surfaces 731 and 732 thereof being aspheric; and a plastic fourth lens element 740 with negative refractive power having a concave object-side surface 741 and a convex image-side surface 742, the object-side and image-side surfaces 741 and 742 thereof being aspheric, at least one inflection point is positioned on both the object-side surface 741 and the image-side surface 742;

wherein, the shape of the image-side surface 742 of the fourth lens element 740 changes from convex when near the optical axis to concave when away from the optical axis;

wherein a stop, can be an aperture stop 700 is disposed between the first lens element 710 and the second lens element 720;

the optical lens system further comprises a filter 750 disposed between the image-side surface 742 of the fourth lens element 740 and an image plane 780; the filter 750 is an IR pass-filter made of glass and has no influence on the focal length of the optical lens system; the optical lens system further comprises an image sensor 770 provided on the image plane 780.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20; wherein the units of HFOV and ANG42 are expressed in degree (deg.).

TABLE 20

(Embodiment 7)

| f [mm] | 5.72 | f/f1 + f/f2 | −0.44 |
|---|---|---|---|
| Fno | 2.60 | f/f3 | 1.79 |
| HFOV [deg.] | 26.6 | f3/f4 | −0.17 |
| (T23 + T34)/CT3 | 0.18 | tan(HFOV) | 0.50 |
| f/R1 | 2.01 | ANG42 [deg.] | 11.4 |
| (R5 + R6)/(R5 − R6) | −0.35 | SD/TD | 0.64 |
| R7/R6 | 0.39 | | |

Embodiment 8

Figure 8A:
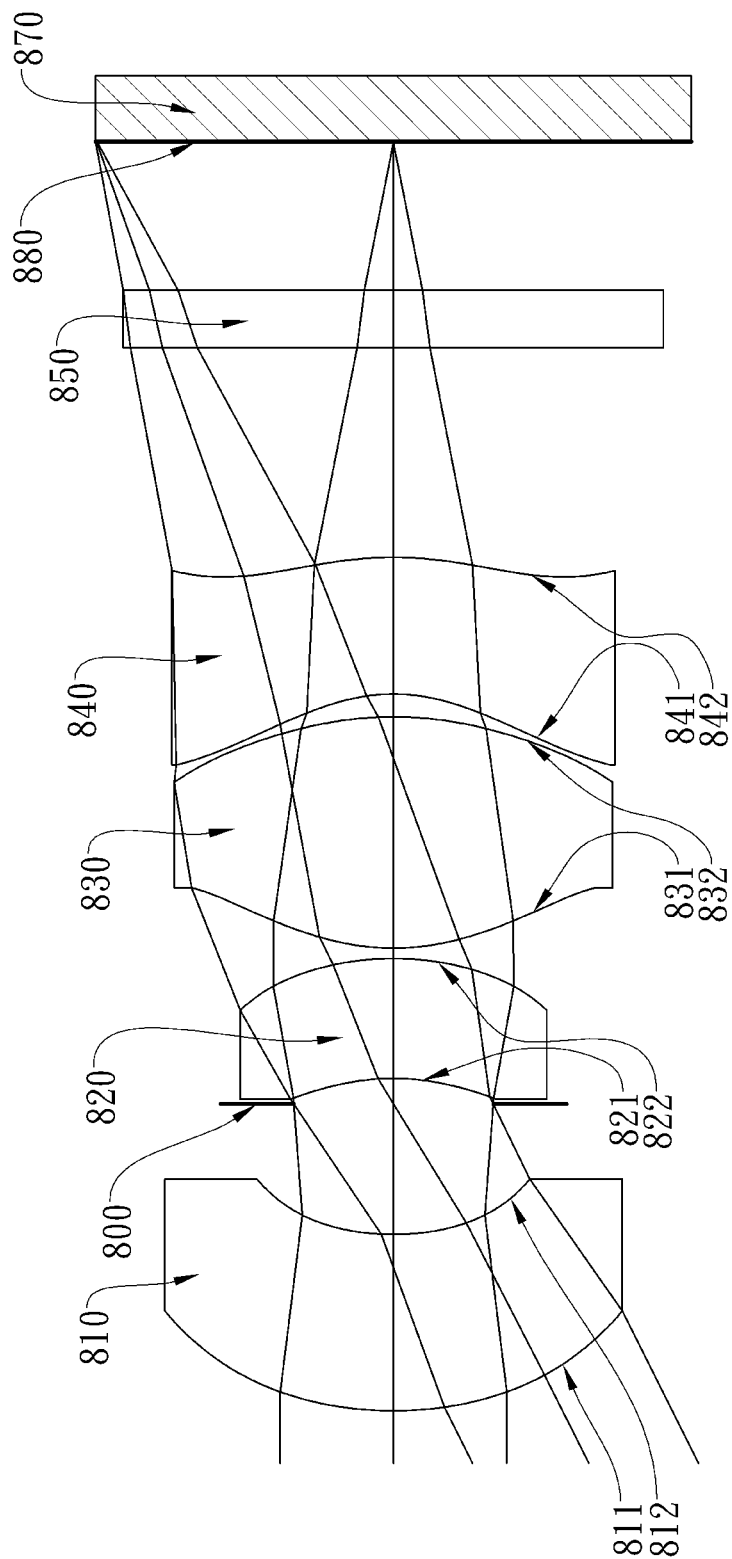
FIG. 8A shows an optical lens system in accordance with an eighth embodiment of the present invention.
Figure 8B:
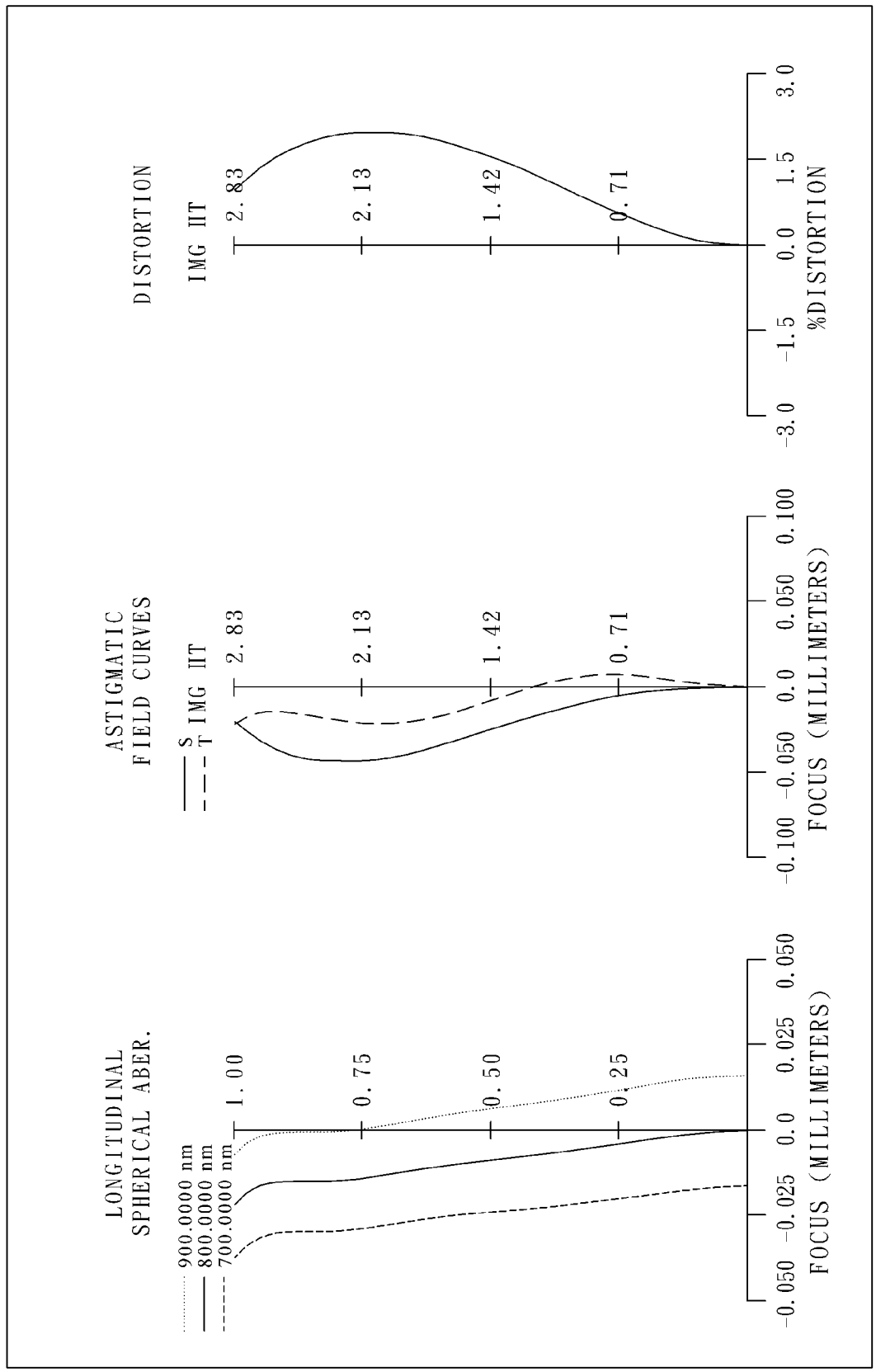
FIG. 8B shows the aberration curves of the eighth embodiment of the present invention.

FIG. 8A shows an optical lens system in accordance with the eighth embodiment of the present invention, and FIG. 8B shows the aberration curves of the eighth embodiment of the present invention. The optical lens system of the eighth embodiment of the present invention mainly comprises four lens elements, in order from an object side to an image side:

a plastic first lens element 810 with negative refractive power having a convex object-side surface 811 and a concave image-side surface 812, the object-side and image-side surfaces 811 and 812 thereof being aspheric;

TABLE 18

(Embodiment 7)
f = 5.72 mm, Fno = 2.60, HFOV = 26.6 deg.

| Surface # | | Curvature | Thickness | Material | Index | Focal Length |
|---|---|---|---|---|---|---|
| 0 | Object | Plane | Infinity | | | |
| 1 | Lens 1 | 2.851710 (ASP) | 1.641 | Plastic | 1.537 | −33.58 |
| 2 | | 1.967180 (ASP) | 1.253 | APEL-5514ML | | |
| 3 | Ape. Stop | Plane | 0.435 | | | |
| 4 | Lens 2 | −2.346410 (ASP) | 0.970 | Plastic | 1.537 | −21.28 |
| 5 | | −3.378700 (ASP) | 0.100 | APEL-5514ML | | |
| 6 | Lens 3 | 2.272530 (ASP) | 2.174 | Plastic | 1.537 | 3.20 |
| 7 | | −4.704800 (ASP) | 0.287 | APEL-5514ML | | |
| 8 | Lens 4 | −1.840560 (ASP) | 1.287 | Plastic | 1.617 | −19.39 |
| 9 | | −2.755620 (ASP) | 2.000 | EP5000 | | |
| 10 | Filter | Plane | 0.550 | Glass | 1.510 | — |
| 11 | | Plane | 1.416 | HOYA-BSC7 | | |
| 12 | Image | Plane | — | | | |

*Reference wavelength for Focal length and Index calculation is 800.0 nm

TABLE 19

Aspheric Coefficients

| | Surface # | | | | | | | |
|---|---|---|---|---|---|---|---|---|
| | 1 | 2 | 4 | 5 | 6 | 7 | 8 | 9 |
| k = | −2.30266E+00 | −1.88537E+00 | −1.05075E+00 | −7.65973E+00 | −1.35368E+00 | −1.12992E+00 | −1.64525E+00 | −2.99181E+00 |
| A4 = | 1.64624E−02 | 5.03336E−02 | 5.29308E−02 | −1.95557E−02 | −1.59642E−02 | 1.63490E−03 | 2.77595E−02 | 1.67993E−02 |
| A6 = | −8.00546E−04 | 3.44038E−03 | −3.79612E−02 | −6.70451E−03 | 3.65523E−03 | 1.40353E−03 | −2.90145E−03 | 1.66417E−03 |
| A8 = | 3.76751E−04 | 2.51085E−03 | 2.34393E−02 | 1.69072E−03 | −6.93072E−04 | −6.28809E−04 | 1.78890E−04 | −2.22621E−04 |
| A10 = | −5.59451E−05 | −1.91290E−03 | −2.28028E−02 | −1.20374E−03 | 1.06544E−05 | 4.81146E−05 | 3.37671E−06 | −4.63879E−06 |
| A12 = | | | 1.22684E−02 | 2.28347E−04 | | | | |
| A14 = | | | −2.95526E−03 | −2.42085E−05 | | | | | a plastic second lens element 820 with negative refractive power having a concave object-side surface 821 and a convex image-side surface 822, the object-side and image-side surfaces 821 and 822 thereof being aspheric;

a glass third lens element 830 with positive refractive power having a convex object-side surface 831 and a convex image-side surface 832, the object-side and image-side surfaces 831 and 832 thereof being aspheric; and a plastic fourth lens element 840 with negative refractive power having a concave object-side surface 841 and a convex image-side surface 842, the object-side and image-side surfaces 841 and 842 thereof being aspheric, at least one inflection point is positioned on both the object-side surface 841 and the image-side surface 842;

wherein, the shape of the image-side surface 842 of the fourth lens element 840 changes from convex when near the optical axis to concave when away from the optical axis;

wherein a stop, can be an aperture stop 800 is disposed between the first lens element 810 and the second lens element 820;

the optical lens system further comprises a filter 850 disposed between the image-side surface 842 of the fourth lens element 840 and an image plane 880; the filter 850 is an IR pass-filter made of glass and has no influence on the focal length of the optical lens system; the optical lens system further comprises an image sensor 870 provided on the image plane 880.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23; wherein the units of HFOV and ANG42 are expressed in degree (deg.).

TABLE 23

(Embodiment 8)

| f [mm] | 5.62 | f/f1 + f/f2 | −0.31 |
|---|---|---|---|
| Fno | 2.60 | f/f3 | 1.84 |
| HFOV [deg.] | 26.6 | f3/f4 | −0.37 |
| (T23 + T34)/CT3 | 0.14 | tan(HFOV) | 0.50 |
| f/R1 | 1.62 | ANG42 [deg.] | 13.2 |
| (R5 + R6)/(R5 − R6) | −0.21 | SD/TD | 0.64 |
| R7/R6 | 0.50 | | |

Embodiment 9

Figure 9A:
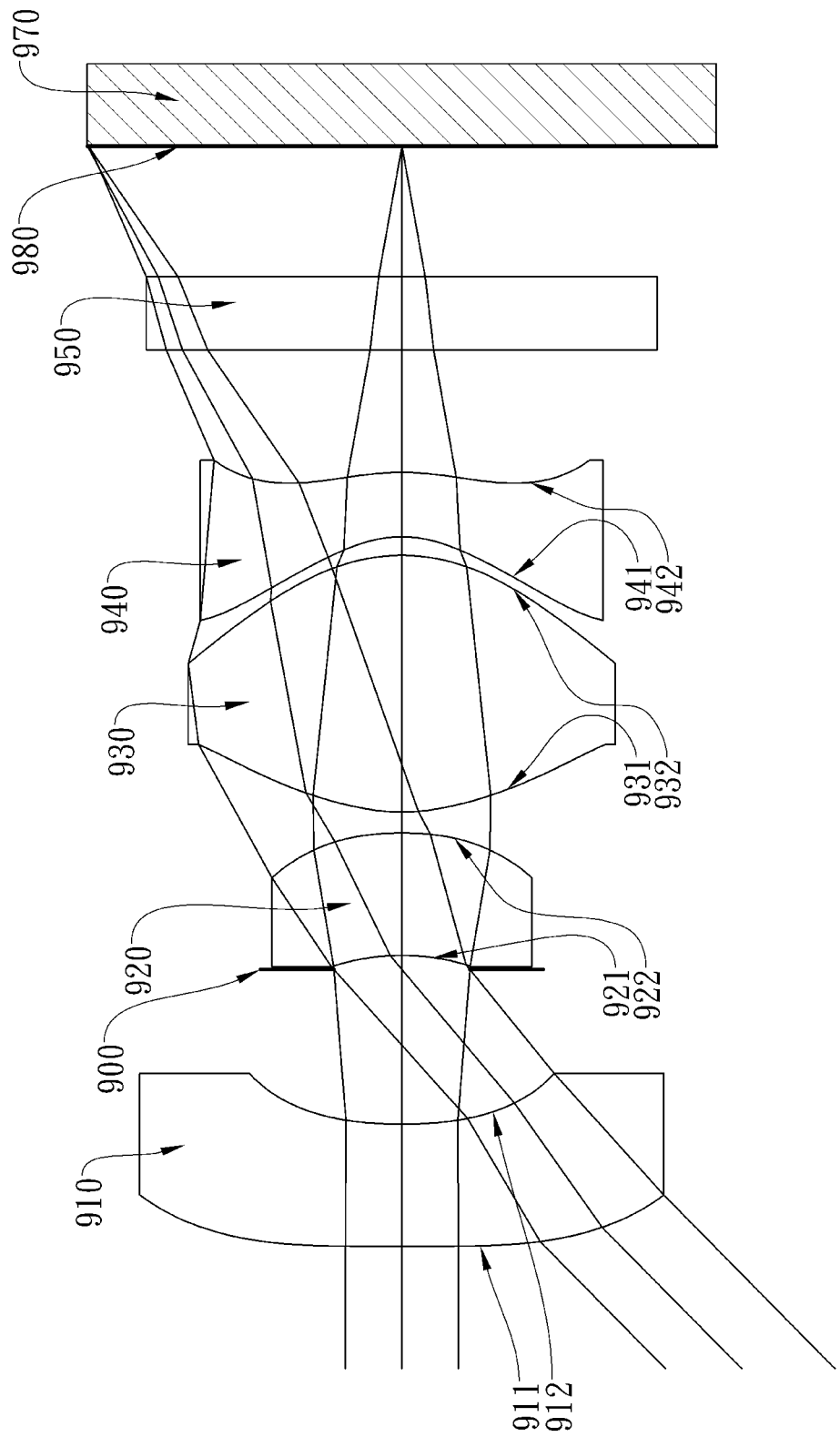
FIG. 9A shows an optical lens system in accordance with a ninth embodiment of the present invention.
Figure 9B:
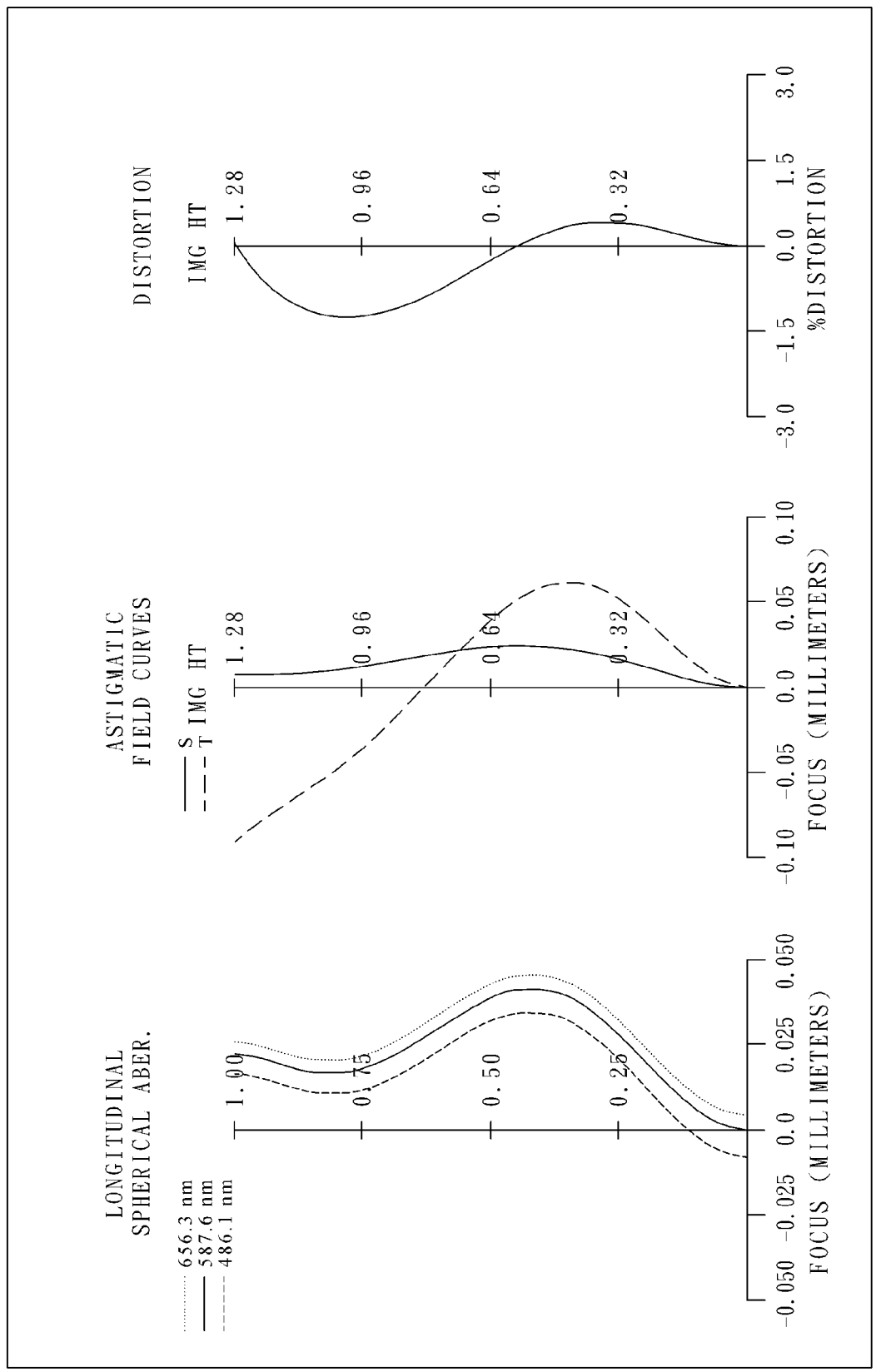
FIG. 9B shows the aberration curves of the ninth embodiment of the present invention.

FIG. 9A shows an optical lens system in accordance with the ninth embodiment of the present invention, and FIG. 9B shows the aberration curves of the ninth embodiment of the present invention. The optical lens system of the ninth embodiment of the present invention mainly comprises four lens elements, in order from an object side to an image side:

a plastic first lens element 910 with negative refractive power having a convex object-side surface 911 and a concave image-side surface 912, the object-side and image-side surfaces 911 and 912 thereof being aspheric;

TABLE 21

(Embodiment 8)
f = 5.62 mm, Fno = 2.60, HFOV = 26.6 deg.

| Surface # | | Curvature | Thickness | Material | Index | Focal Length |
|---|---|---|---|---|---|---|
| 0 | Object | Plane | Infinity | | | |
| 1 | Lens 1 | 3.474400 (ASP) | 1.684 | Plastic | 1.537 | −30.74 |
| 2 | | 2.384320 (ASP) | 1.246 | APEL-5514ML | | |
| 3 | Ape. Stop | Plane | 0.245 | | | |
| 4 | Lens 2 | −2.152350 (ASP) | 1.144 | Plastic | 1.537 | −43.36 |
| 5 | | −2.811950 (ASP) | 0.100 | APEL-5514ML | | |
| 6 | Lens 3 | 2.255360 (ASP) | 2.209 | Glass | 1.511 | 3.06 |
| 7 | | −3.422500 (ASP) | 0.218 | KPBK40_SUMITA | | |
| 8 | Lens 4 | −1.709680 (ASP) | 1.306 | Plastic | 1.617 | −8.19 |
| 9 | | −3.337000 (ASP) | 2.000 | EP5000 | | |
| 10 | Filter | Plane | 0.550 | Glass | 1.510 | — |
| 11 | | Plane | 1.421 | HOYA-BSC7 | | |
| 12 | Image | Plane | — | | | |

*Reference wavelength for Focal length and Index calculation is 800.0 nm

TABLE 21

Aspheric Coefficients

| Surface # | 1 | 2 | 4 | 5 | 6 | 7 | 8 | 9 |
|---|---|---|---|---|---|---|---|---|
| k = | −3.22479E+00 | −2.03909E+00 | −9.63208E−01 | −3.73957E+00 | −1.33670E+00 | −1.29244E+00 | −1.59501E+00 | −4.46439E+00 |
| A4 = | 1.57569E−02 | 4.95526E−02 | 5.14107E−02 | −2.35098E−02 | −1.61923E−02 | 2.34534E−03 | 2.88163E−02 | 1.96755E−02 |
| A6 = | −3.60428E−04 | 7.86226E−03 | −3.87449E−02 | −6.23226E−03 | 3.31790E−03 | 1.21320E−03 | −2.63711E−03 | 1.43797E−03 |
| A8 = | 1.57154E−04 | 5.39808E−04 | 3.10648E−02 | 1.92681E−03 | −8.07260E−04 | −6.01379E−04 | 1.64811E−04 | −3.11321E−04 |
| A10 = | −1.03700E−05 | 1.01746E−03 | −2.78497E−02 | −1.21263E−03 | 6.24006E−06 | 4.38877E−05 | 2.66766E−06 | 7.32189E−07 |
| A12 = | | | 1.20802E−02 | 2.33634E−04 | | | | |
| A14 = | | | −1.89683E−03 | −2.49019E−05 | | | | | a plastic second lens element 920 with negative refractive power having a concave object-side surface 921 and a convex image-side surface 922, the object-side and image-side surfaces 921 and 922 thereof being aspheric;

a plastic third lens element 930 with positive refractive power having a convex object-side surface 931 and a convex image-side surface 932, the object-side and image-side surfaces 931 and 932 thereof being aspheric; and a plastic fourth lens element 940 with negative refractive power having a concave object-side surface 941 and a convex image-side surface 942, the object-side and image-side surfaces 941 and 942 thereof being aspheric, at least one inflection point is positioned on both the object-side surface 941 and the image-side surface 942;

wherein, the shape of the image-side surface 942 of the fourth lens element 940 changes from convex when near the optical axis to concave when away from the optical axis;

wherein a stop, can be an aperture stop 900 is disposed between the first lens element 910 and the second lens element 920;

the optical lens system further comprises a filter 950 disposed between the image-side surface 942 of the fourth lens element 940 and an image plane 980; the filter 950 is an IR cut-filter made of glass and has no influence on the focal length of the optical lens system; the optical lens system further comprises an image sensor 970 provided on the image plane 980.

The detailed optical data of the ninth embodiment is shown in TABLE 24, and the aspheric surface data is shown in TABLE 25 wherein the units of the radius of curvature, the thickness and the focal length are expressed in mm, and HFOV is half of the maximal field of view.

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26; wherein the units of HFOV and ANG42 are expressed in degree (deg.).

TABLE 26

(Embodiment 9)

| f [mm] | 1.29 | f/f1 + f/f2 | −0.55 |
|---|---|---|---|
| Fno | 2.80 | f/f3 | 1.41 |
| HFOV [deg.] | 44.5 | f3/f4 | −0.57 |
| (T23 + T34)/CT3 | 0.15 | tan(HFOV) | 0.98 |
| f/R1 | 0.01 | ANG42 [deg.] | 37.1 |
| (R5 + R6)/(R5 − R6) | 0.00 | SD/TD | 0.64 |
| R7/R6 | 0.62 | | |

Embodiment 10

Figure 10A:
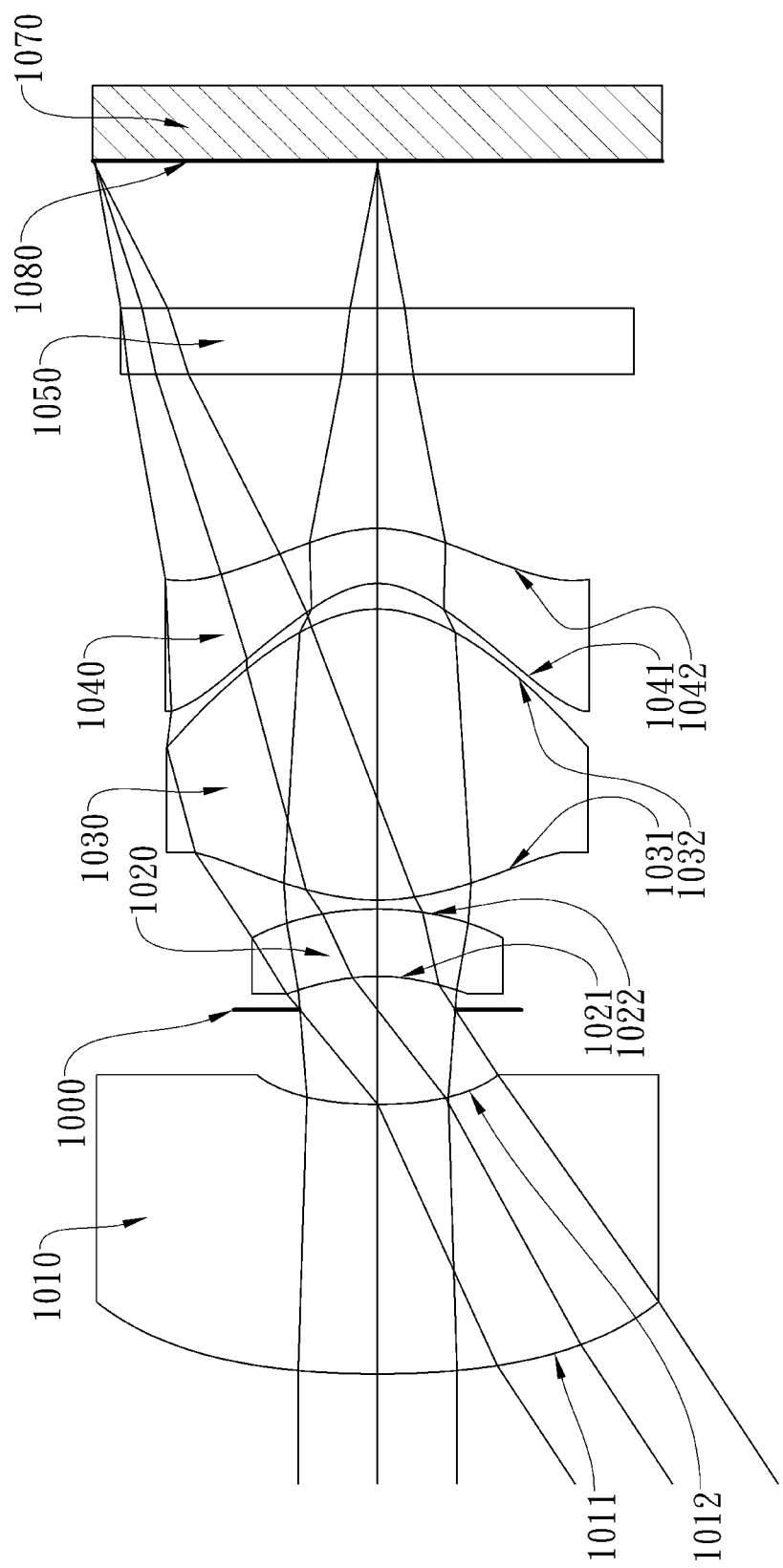
FIG. 10A shows an optical lens system in accordance with a tenth embodiment of the present invention.
Figure 10B:
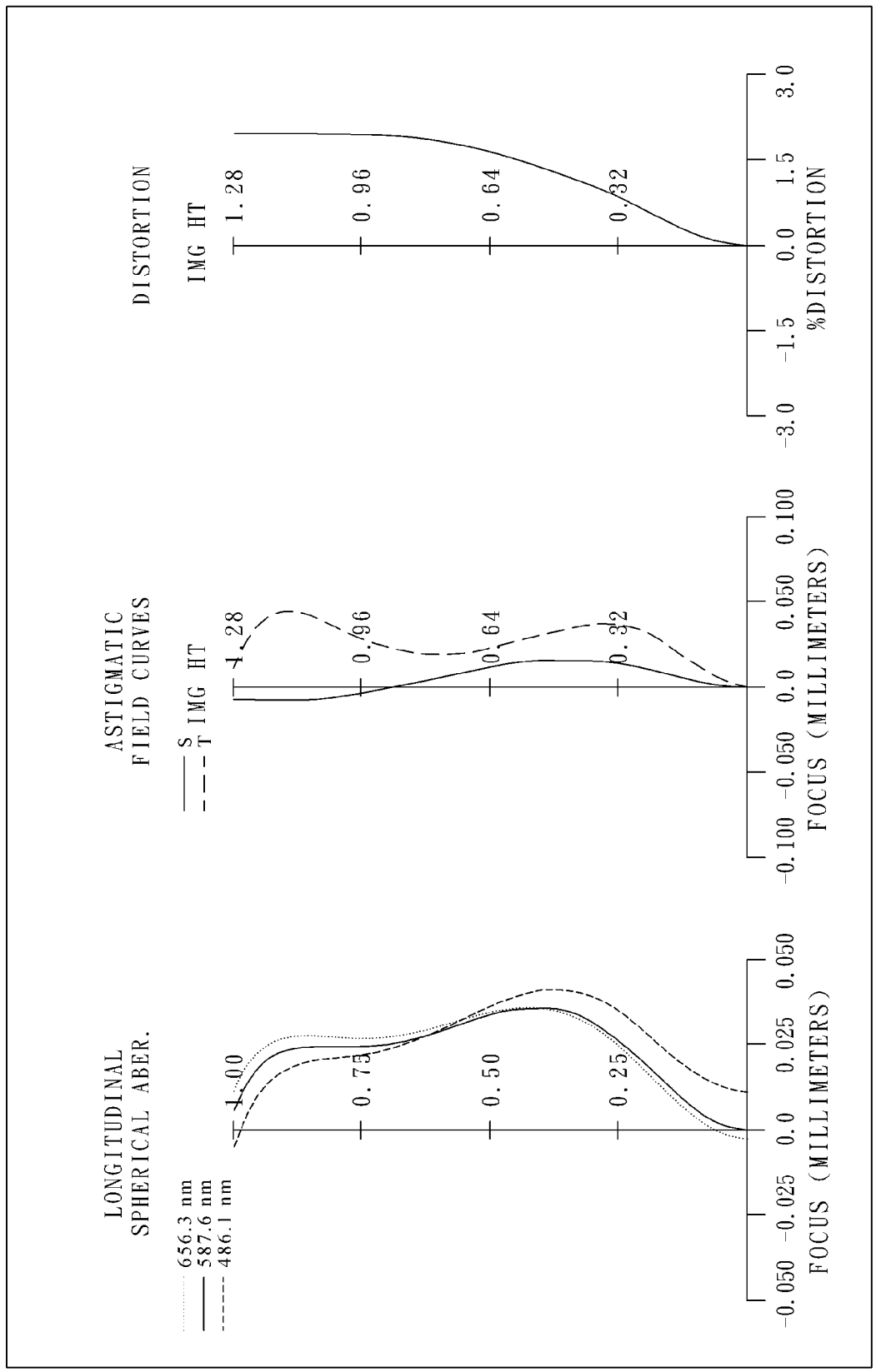
FIG. 10B shows the aberration curves of the tenth embodiment of the present invention.

FIG. 10A shows an optical lens system in accordance with the tenth embodiment of the present invention, and FIG. 10B shows the aberration curves of the tenth embodiment of the present invention. The optical lens system of the tenth embodiment of the present invention mainly comprises four lens elements, in order from an object side to an image side:

a plastic first lens element 1010 with negative refractive power having a convex object-side surface 1011 and a concave image-side surface 1012, the object-side and image-side surfaces 1011 and 1012 thereof being aspheric;

TABLE 24

(Embodiment 9)
f = 1.29 mm, Fno = 2.80, HFOV = 44.5 deg.

| Surface # | | Curvature | Thickness | Material | Index | Focal Length |
|---|---|---|---|---|---|---|
| 0 | Object | Plane | Infinity | | | |
| 1 | Lens 1 | 100.000000 (ASP) | 0.500 | Plastic | 1.544 | −3.06 |
| 2 | | 1.633490 (ASP) | 0.633 | APEL-5514ML | | |
| 3 | Ape. Stop | Plane | 0.057 | | | |
| 4 | Lens 2 | −0.975260 (ASP) | 0.501 | Plastic | 1.544 | −10.25 |
| 5 | | −1.395790 (ASP) | 0.086 | APEL-5514ML | | |
| 6 | Lens 3 | 0.755770 (ASP) | 1.050 | Plastic | 1.544 | 0.92 |
| 7 | | −0.749370 (ASP) | 0.076 | APEL-5514ML | | |
| 8 | Lens 4 | −0.468110 (ASP) | 0.263 | Plastic | 1.634 | −1.61 |
| 9 | | −1.055890 (ASP) | 0.500 | EP5000 | | |
| 10 | Filter | Plane | 0.300 | Glass | 1.510 | — |
| 11 | | Plane | 0.534 | HOYA-BSC7 | | |
| 12 | Image | Plane | — | | | |

*Reference wavelength for Focal length and Index calculation is 587.6 nm

TABLE 25

Aspheric Coefficients

| Surface # | | | | | | | | |
|---|---|---|---|---|---|---|---|---|
| | 1 | 2 | 4 | 5 | 6 | 7 | 8 | 9 |
| k = | −1.00000E+00 | −2.26379E+01 | 2.44722E+00 | 4.70672E+00 | −1.11681E+01 | −3.65572E+00 | −2.37919E+00 | −5.97360E+00 |
| A4 = | 2.12801E−01 | 8.93252E−01 | 1.09561E−02 | −2.05166E+00 | 4.77549E−01 | −7.54279E−01 | 3.86487E−01 | 1.09974E+00 |
| A6 = | −8.56739E−02 | −1.57570E−01 | −1.87685E+00 | 1.15036E+01 | −7.12361E−01 | 1.40389E+00 | −8.94140E−01 | −1.19684E+00 |
| A8 = | 2.36058E−02 | −8.09270E−01 | 6.28677E+01 | −3.53845E+01 | 6.49527E−01 | −1.08849E+00 | 1.35807E+00 | 1.02253E+00 |
| A10 = | 6.99045E−03 | 2.60956E+00 | −7.80136E+02 | 4.98197E+01 | −5.04065E−01 | 8.51078E−02 | −6.78330E−01 | −2.63938E−01 |
| A12 = | | | 3.30599E+03 | 2.70489E−05 | 1.66275E−01 | 2.53728E−01 | 7.94125E−02 | 3.79165E−02 |
| A14 = | | | 2.35064E−04 | −3.06135E−06 | −3.62442E−04 | −4.83247E−02 | 1.22769E−02 | −2.12300E−05 | a plastic second lens element 1020 with negative refractive power having a concave object-side surface 1021 and a convex image-side surface 1022, the object-side and image-side surfaces 1021 and 1022 thereof being aspheric;

a plastic third lens element 1030 with positive refractive power having a convex object-side surface 1031 and a convex image-side surface 1032, the object-side and image-side surfaces 1031 and 1032 thereof being aspheric; and a plastic fourth lens element 1040 with negative refractive power having a concave object-side surface 1041 and a convex image-side surface 1042, the object-side and image-side surfaces 1041 and 1042 thereof being aspheric, at least one inflection point is positioned on both the object-side surface 1041 and the image-side surface 1042;

wherein, the shape of the image-side surface 1042 of the fourth lens element 1040 changes from convex when near the optical axis to concave when away from the optical axis;

wherein a stop, can be an aperture stop 1000 is disposed between the first lens element 1010 and the second lens element 1020;

the optical lens system further comprises a filter 1050 disposed between the image-side surface 1042 of the fourth lens element 1040 and an image plane 1080; the filter 1050 is an IR cut-filter made of glass and has no influence on the focal length of the optical lens system; the optical lens system further comprises an image sensor 1070 provided on the image plane 1080.

The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29; wherein the units of HFOV and ANG42 are expressed in degree (deg.).

TABLE 29

(Embodiment 10)

| f [mm] | 1.91 | f/f1 + f/f2 | −0.79 |
|---|---|---|---|
| Fno | 2.65 | f/f3 | 2.06 |
| HFOV [deg.] | 33.3 | f3/f4 | −0.60 |
| (T23 + T34)/CT3 | 0.12 | tan(HFOV) | 0.66 |
| f/R1 | 0.43 | ANG42 [deg.] | 9.1 |
| (R5 + R6)/(R5 − R6) | 0.25 | SD/TD | 0.57 |
| R7/R6 | 0.61 | | |

Embodiment 11

Figure 11A:
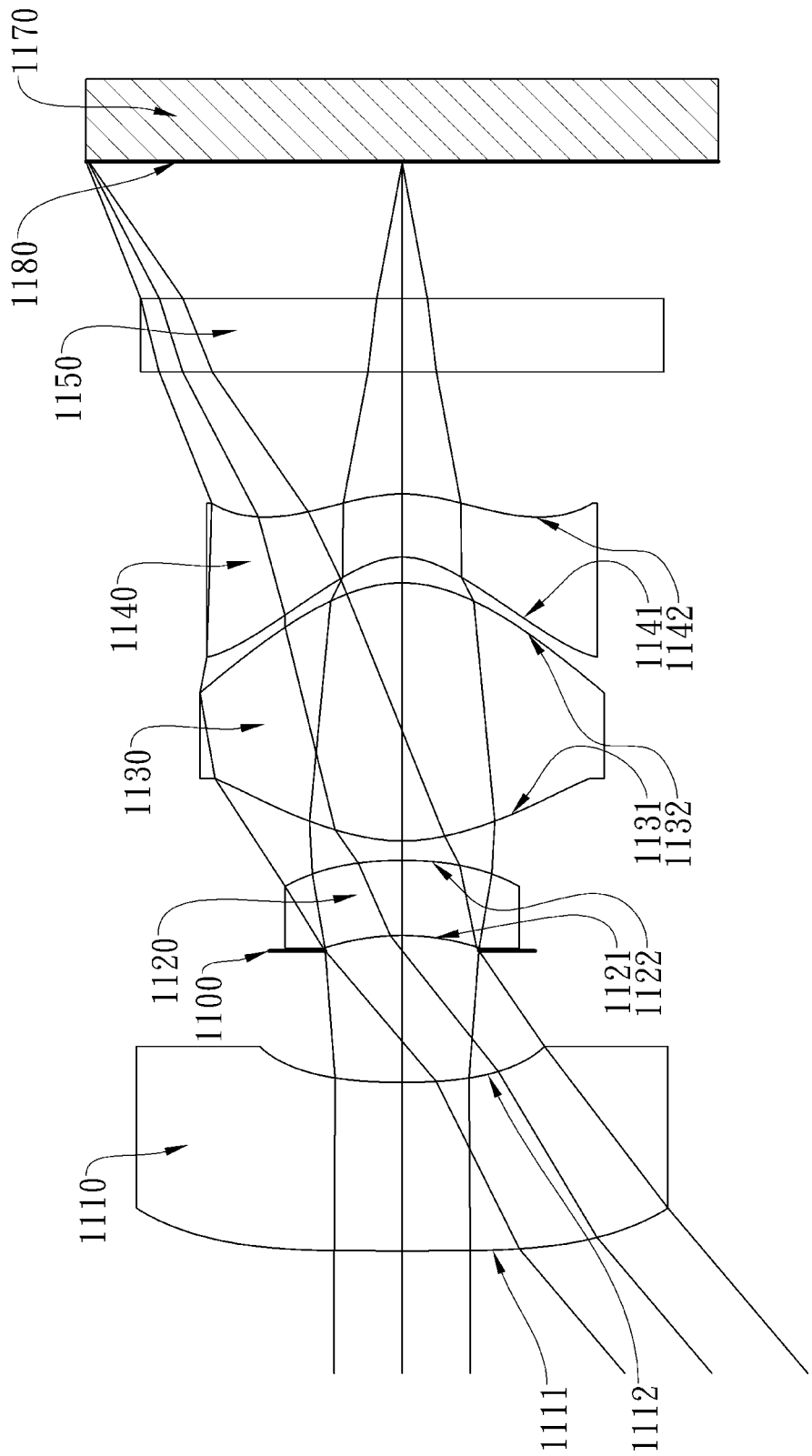
FIG. 11A shows an optical lens system in accordance with an eleventh embodiment of the present invention.
Figure 11B:
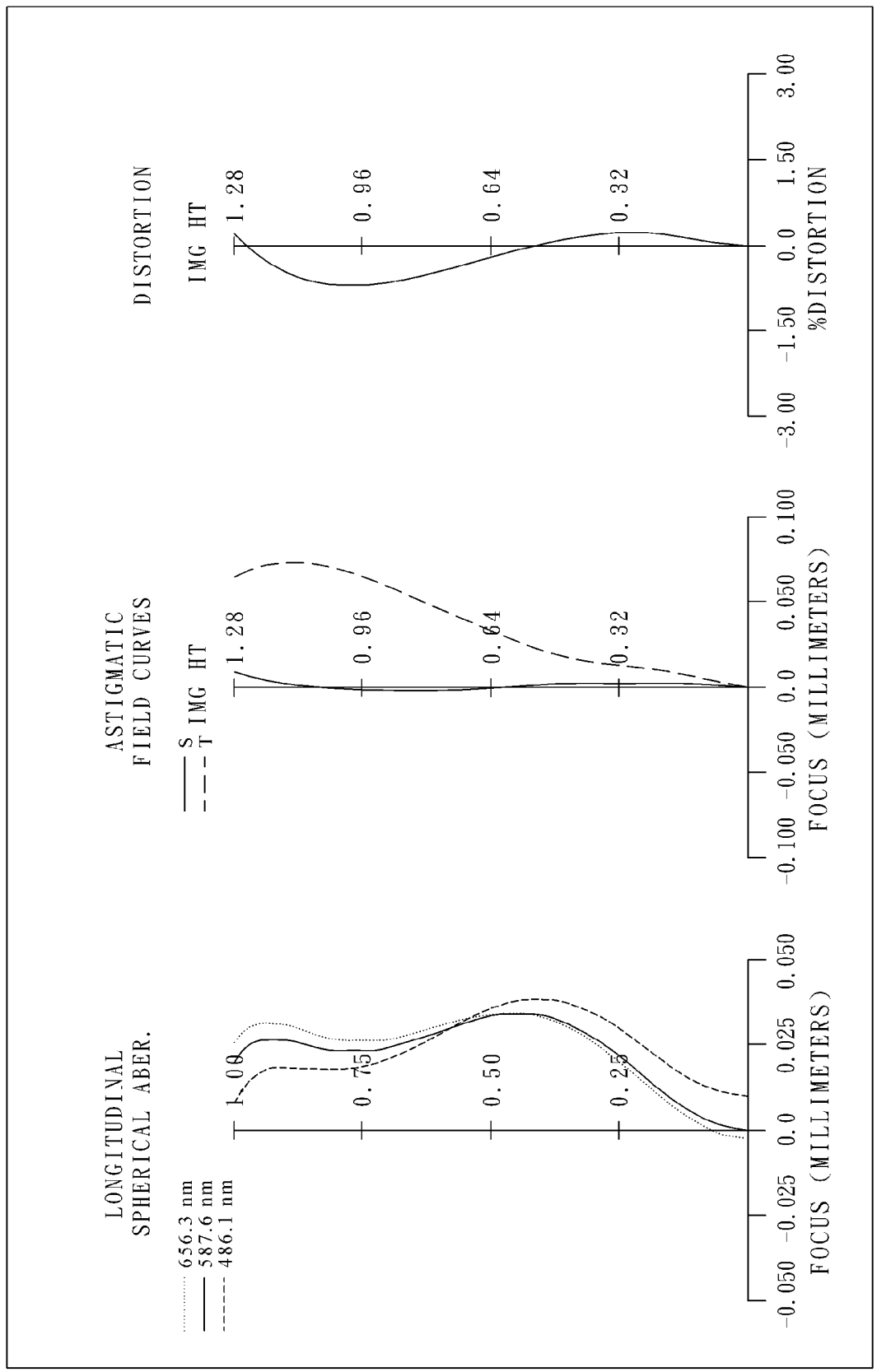
FIG. 11B shows the aberration curves of the eleventh embodiment of the present invention.

FIG. 11A shows an optical lens system in accordance with the eleventh embodiment of the present invention, and FIG. 11B shows the aberration curves of the eleventh embodiment of the present invention. The optical lens system of the eleventh embodiment of the present invention mainly comprises four lens elements, in order from an object side to an image side:

a plastic first lens element 1110 with negative refractive power having a convex object-side surface 1111 and a concave image-side surface 1112, the object-side and image-side surfaces 1111 and 1112 thereof being aspheric;

TABLE 27

(Embodiment 10)
f = 1.91 mm, Fno = 2.65, HFOV = 33.3 deg.

| Surface # | | Curvature | Thickness | Material | Index | Focal Length |
|---|---|---|---|---|---|---|
| 0 | Object | Plane | Infinity | | | |
| 1 | Lens 1 | 4.455000 (ASP) | 1.225 | Plastic | 1.530 | −6.53 |
| 2 | | 1.762180 (ASP) | 0.430 | E48R25 | | |
| 3 | Ape. Stop | Plane | 0.152 | | | |
| 4 | Lens 2 | −0.930970 (ASP) | 0.305 | Plastic | 1.634 | −3.87 |
| 5 | | −1.691470 (ASP) | 0.041 | EP5000 | | |
| 6 | Lens 3 | 0.879860 (ASP) | 1.323 | Plastic | 1.530 | 0.93 |
| 7 | | −0.531140 (ASP) | 0.117 | E48R25 | | |
| 8 | Lens 4 | −0.322020 (ASP) | 0.250 | Plastic | 1.634 | −1.55 |
| 9 | | −0.623580 (ASP) | 0.700 | EP5000 | | |
| 10 | Filter | Plane | 0.300 | Glass | 1.510 | — |
| 11 | | Plane | 0.669 | HOYA-BSC7 | | |
| 12 | Image | Plane | — | | | |

*Reference wavelength for Focal length and Index calculation is 587.6 nm

TABLE 28

Aspheric Coefficients

| | Surface # | | | | | | | |
|---|---|---|---|---|---|---|---|---|
| | 1 | 2 | 4 | 5 | 6 | 7 | 8 | 9 |
| k = | −1.00000E+00 | −9.87424E+00 | −8.09188E−01 | 6.23183E+00 | −1.50195E+01 | −3.38047E+00 | −1.93808E+00 | −2.21061E+00 |
| A4 = | 5.70254E−02 | 5.86266E−01 | 5.94178E−01 | −1.05087E+00 | 4.77074E−01 | −7.41987E−01 | 3.06784E−01 | 7.96148E−01 |
| A6 = | −1.13425E−02 | 1.11416E−01 | −3.89414E+00 | 8.87065E+00 | −7.81067E−01 | 1.30782E+00 | −9.63878E−01 | −1.26298E+00 |
| A8 = | 5.45082E−03 | −1.27518E+00 | 7.36780E+01 | −2.92443E+01 | 5.58065E−01 | −1.15902E+00 | 1.37903E+00 | 1.08381E+00 |
| A10 = | 4.37112E−04 | 7.15156E+00 | −6.89997E+02 | 3.78310E+01 | −5.88468E−01 | 1.16988E−01 | −6.93095E−01 | −2.00365E−01 |
| A12 = | | | 2.74442E+03 | −7.20705E−06 | 4.49145E−01 | 4.45264E−01 | 1.96988E−01 | −1.47017E−01 |
| A14 = | | | −3.88532E+03 | −3.19645E−05 | −5.48240E−02 | −1.80678E−01 | −7.54759E−02 | 3.61951E−02 | a plastic second lens element 1120 with negative refractive power having a concave object-side surface 1121 and a convex image-side surface 1122, the object-side and image-side surfaces 1121 and 1122 thereof being aspheric;

a plastic third lens element 1130 with positive refractive power having a convex object-side surface 1131 and a convex image-side surface 1132, the object-side and image-side surfaces 1131 and 1132 thereof being aspheric; and a plastic fourth lens element 1140 with negative refractive power having a concave object-side surface 1141 and a convex image-side surface 1142, the object-side and image-side surfaces 1141 and 1142 thereof being aspheric, at least one inflection point is positioned on both the object-side surface 1141 and the image-side surface 1142;

wherein, the shape of the image-side surface 1142 of the fourth lens element 1140 changes from convex when near the optical axis to concave when away from the optical axis;

wherein a stop, can be an aperture stop 1100 is disposed between the first lens element 1110 and the second lens element 1120;

the optical lens system further comprises a filter 1150 disposed between the image-side surface 1142 of the fourth lens element 1140 and an image plane 1180; the filter 1150 is an IR cut-filter made of glass and has no influence on the focal length of the optical lens system; the optical lens system further comprises an image sensor 1170 provided on the image plane 1180.

The detailed optical data of the eleventh embodiment is shown in TABLE 30, and the aspheric surface data is shown in TABLE 31, wherein the units of the radius of curvature, the thickness and the focal length are expressed in mm, and HFOV is half of the maximal field of view.

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 29; wherein the units of HFOV and ANG42 are expressed in degree (deg.).

TABLE 32

(Embodiment 11)

| | | | |
|---|---|---|---|
| f [mm] | 1.50 | f/f1 + f/f2 | −0.73 |
| Fno | 2.70 | f/f3 | 1.92 |
| HFOV [deg.] | 40.2 | f3/f4 | −0.67 |
| (T23 + T34)/CT3 | 0.18 | tan(HFOV) | 0.85 |
| f/R1 | 0.02 | ANG42 [deg.] | 31.0 |
| (R5 + R6)/(R5 − R6) | 0.15 | SD/TD | 0.60 |
| R7/R6 | 0.58 | | |

It is to be noted that TABLES 1-32 show different data of the different embodiments, however, the data of the different embodiments are obtained from experiments. Therefore, any optical lens system of the same structure is considered to be within the scope of the present invention even if it uses different data. The embodiments depicted above and the appended drawings are exemplary and are not intended to limit the scope of the present invention.

What is claimed is:

1. An optical lens system, in order from an object side to an image side comprising:

a first lens element with negative refractive power having a convex object-side surface;

TABLE 30

(Embodiment 11)
f = 1.50 mm, Fno = 2.70, HFOV = 40.2 deg.

| Surface # | | Curvature | Thickness | Material | Index | Focal Length |
|---|---|---|---|---|---|---|
| 0 | Object | Plane | Infinity | | | |
| 1 | Lens 1 | 100.000000 (ASP) | 0.690 | Plastic | 1.544 | −4.48 |
| 2 | | 2.372160 (ASP) | 0.539 | APEL-5514ML | | |
| 3 | Ape. Stop | Plane | 0.062 | | | |
| 4 | Lens 2 | −1.002760 (ASP) | 0.307 | Plastic | 1.634 | −3.83 |
| 5 | | −1.910920 (ASP) | 0.080 | EP5000 | | |
| 6 | Lens 3 | 0.692440 (ASP) | 1.057 | Plastic | 1.544 | 0.78 |
| 7 | | −0.509280 (ASP) | 0.105 | APEL-5514ML | | |
| 8 | Lens 4 | −0.296220 (ASP) | 0.258 | Plastic | 1.634 | −1.18 |
| 9 | | −0.657760 (ASP) | 0.500 | EP5000 | | |
| 10 | Filter | Plane | 0.300 | Glass | 1.510 | — |
| 11 | | Plane | 0.561 | HOYA-BSC7 | | |
| 12 | Image | Plane | — | | | |

*Reference wavelength for Focal length and Index calculation is 587.6 nm

TABLE 31

Aspheric Coefficients

| | Surface # | | | | | | | |
|---|---|---|---|---|---|---|---|---|
| | 1 | 2 | 4 | 5 | 6 | 7 | 8 | 9 |
| k = | −1.00000E+00 | −3.97435E+01 | 1.16603E+00 | 4.23030E+00 | −8.73188E+00 | −3.78339E+00 | −2.27827E+00 | −4.34939E+00 |
| A4 = | 1.60759E−01 | 7.82159E−01 | 2.86741E−01 | −1.88339E+00 | 4.71781E−01 | −7.43096E−01 | 3.97159E−01 | 1.01230E+00 |
| A6 = | −7.12239E−02 | −8.71916E−02 | −1.79190E+00 | 1.07107E+01 | −7.38666E−01 | 1.41612E+00 | −8.80594E−01 | −1.18131E+00 |
| A8 = | 3.76594E−02 | −1.25084E+00 | 6.32998E+01 | −3.62274E+01 | 6.23616E−01 | −1.11327E+00 | 1.41434E+00 | 1.11205E+00 |
| A10 = | −4.64331E−03 | 5.74331E+00 | −7.16147E+02 | 4.78360E+01 | −5.76243E−01 | 3.46491E−02 | −6.23369E−01 | −2.40626E−01 |
| A12 = | | | 2.54008E+03 | −2.26520E+00 | 1.93090E−01 | 1.98208E−01 | −1.37810E−02 | −3.70528E−02 |
| A14 = | | | 2.33914E−04 | −3.63623E−06 | 3.23325E−02 | 9.82032E−02 | 4.45342E−02 | −9.08266E−02 | a second lens element with negative refractive power having a concave object-side surface and a convex image-side surface;
a third lens element with positive refractive power;
a plastic fourth lens element with negative refractive power having a concave object-side surface and a convex image-side surface, with both the object-side and image-side surfaces thereof being aspheric, and having at least one inflection point positioned on at least one of the object-side and image-side surfaces thereof;
wherein the number of lens elements with refractive power is limited to four.

2. The optical lens system according to claim 1, wherein a curvature radius of the object-side surface of the third lens element is R5, a curvature radius of the image-side surface of the third lens element is R6, and they satisfy the following relation:

$$1.0 < (R5+R6)/(R5-R6) < 1.0.$$

3. The optical lens system according to claim 2, wherein a curvature radius of the object-side surface of the fourth lens element is R7, a curvature radius of the image-side surface of the third lens element is R6, and they satisfy the following relation:

$$0 < R7/R6 < 0.9.$$

4. The optical lens system according to claim 2, wherein a focal length of the optical lens system is f, a focal length of the first lens element is f1, a focal length of the second lens element is f2, and they satisfy the following relation:

$$-1.2 < f/f1 + f/f2 < -0.35.$$

5. The optical lens system according to claim 2, further comprising a stop, an axial distance between the stop and the image-side surface of the fourth lens element is SD, an axial distance between the object-side surface of the first lens element and the image-side surface of the fourth lens element is TD, and they satisfy the following relation:

$$0.50 < SD/TD < 0.90.$$

6. The optical lens system according to claim 2, wherein the curvature radius of the object-side surface of the third lens element is R5, the curvature radius of the image-side surface of the third lens element is R6, and they satisfy the following relation:

$$-0.5 < (R5+R6)/(R5-R6) < 0.5.$$

7. The optical lens system according to claim 1, wherein a focal length of the optical lens system is f, a curvature radius of the object-side surface of the first lens element is R1, and they satisfy the following relation:

$$0 < f/R1 < 2.4.$$

8. The optical lens system according to claim 7, wherein an axial distance between the second lens element and the third lens element is T23, an axial distance between the third lens element and the fourth lens element is T34, a central thickness of the third lens element is CT3, and they satisfy the following relation:

$$0 < (T23+T34)/CT3 < 0.40.$$

9. The optical lens system according to claim 7, wherein half of the maximal field of view of the optical lens system is HFOV, and it satisfies the following relation:

$$0.35 < \tan(HFOV) < 1.2.$$

10. The optical lens system according to claim 7, wherein an angle between a vertical plane to the optical axis and a tangent plane of the image-side surface of the fourth lens element at the position of the farthest clear aperture radius thereof is ANG42; wherein the value of ANG42 is defined as negative while the tangent plane leans to the object-side, whereas defined as positive while the tangent plane leans to the image-side; wherein ANG42 satisfies the following relation: ANG42>0 degree.

11. The optical lens system according to claim 7, wherein the focal length of the optical lens system is f, a focal length of the third lens element is f3, and they satisfy the following relation:

$$1.5 < f/f3 < 2.7.$$

12. The optical lens system according to claim 1, wherein a focal length of the third lens element is f3, a focal length of the fourth lens element is f4, and they satisfy the following relation:

$$-1.0 < f3/f4 < 0.$$

13. The optical lens system according to claim 12, wherein the optical lens system is applicable for the wavelength range of 750 nm ~1200 nm.

14. The optical lens system according to claim 12, wherein at least one of the object-side and image-side surfaces of each lens element with refractive power in the optical lens system is aspheric, and the shape of the image-side surface of the fourth lens element changes from convex when near the optical axis to concave when away from the optical axis.

15. An optical lens system, in order from an object side to an image side comprising:
a first lens element with negative refractive power having a convex object-side surface;
a second lens element with negative refractive power;
a third lens element with positive refractive power;
a plastic fourth lens element with negative refractive power having a concave object-side surface and a convex image-side surface, and both the object-side and image-side surfaces thereof being aspheric;
wherein the number of lens elements with refractive power is limited to four;
wherein an angle between a vertical plane to the optical axis and a tangent plane of the image-side surface of the fourth lens element at the position of the farthest clear aperture radius thereof is ANG42; wherein the value of ANG42 is defined as negative while the tangent plane leans to the object-side, whereas defined as positive while the tangent plane leans to the image-side; wherein ANG42 satisfies the following relation:

$$ANG42 > 0 \text{ degree}.$$

16. The optical lens system according to claim 15, wherein the second lens element has a concave object-side surface and a convex image-side surface.

17. The optical lens system according to claim 15, wherein a focal length of the optical lens system is f, a curvature radius of the object-side surface of the first lens element is R1, and they satisfy the following relation:

$$0 < f/R1 < 2.4.$$

18. The optical lens system according to claim 15, wherein a curvature radius of the object-side surface of the third lens element is R5, a curvature radius of the image-side surface of the third lens element is R6, and they satisfy the following relation:

$$-1.0 < (R5+R6)/(R5-R6) < 1.0.$$

19. The optical lens system according to claim 15, wherein half of the maximal field of view of the optical lens system is HFOV, and it satisfies the following relation:

$$0.35 < \tan(HFOV) < 1.2.$$

20. The optical lens system according to claim 15, wherein an axial distance between the second lens element and the third lens element is T23, an axial distance between the third lens element and the fourth lens element is T34, a central thickness of the third lens element is CT3, and they satisfy the following relation:

$$0 < (T23+T34)/CT3 < 0.40.$$

21. The optical lens system according to claim 15, wherein a focal length of the third lens element is f3, a focal length of the fourth lens element is f4, and they satisfy the following relation:

$$-1.0 < f3/f4 < 0.$$

22. The optical lens system according to claim 15, wherein the optical lens system is applicable for the wavelength range of 750 nm ~1200 nm.

23. An optical lens system, in order from an object side to an image side comprising:
- a first lens element with negative refractive power having a convex object-side surface;
- a second lens element with negative refractive power;
- a third lens element with positive refractive power;
- a plastic fourth lens element with negative refractive power having a concave object-side surface and a convex image-side surface, and both the object-side and image-side surfaces thereof being aspheric;
- wherein the shape of the image-side surface of the fourth lens element changes from convex when near the optical axis to concave when away from the optical axis;
- wherein the number of lens elements with refractive power is limited to four.

24. The optical lens system according to claim 23, wherein a focal length of the optical lens system is f, a curvature radius of the object-side surface of the first lens element is R1, and they satisfy the following relation:

$$0 < f/R1 < 2.4.$$

25. The optical lens system according to claim 24, wherein the second lens element has a concave object-side surface and a convex image-side surface.

26. The optical lens system according to claim 24, wherein a curvature radius of the object-side surface of the third lens element is R5, a curvature radius of the image-side surface of the third lens element is R6, and they satisfy the following relation:

$$-0.5 < (R5+R6)/(R5-R6) < 0.5.$$

27. The optical lens system according to claim 24, wherein an axial distance between the second lens element and the third lens element is T23, an axial distance between the third lens element and the fourth lens element is T34, a central thickness of the third lens element is CT3, and they satisfy the following relation:

$$0 < (T23+T34)/CT3 < 0.40.$$

28. The optical lens system according to claim 24, wherein at least one of the object-side and image-side surfaces of each lens element with refractive power in the optical lens system is aspheric, the focal length of the optical lens system is f, a focal length of the third lens element is f3, and they satisfy the following relation:

$$1.5 < f/f3 < 2.7.$$

* * * * *

UNITED STATES PATENT AND TRADEMARK OFFICE
CERTIFICATE OF CORRECTION

Page 1 of 1

PATENT NO. : 9,036,270 B2
APPLICATION NO. : 13/532441
DATED : May 19, 2015
INVENTOR(S) : Tsung-Han Tsai and Ming-Ta Chou It is certified that error appears in the above-identified patent and that said Letters Patent is hereby corrected as shown below:

In the Claims

Column 33, lines 18-19, the formula reading
$1.0 < (R5+R6)/(R5-R6) < 1.0$ should read as follows:
-- $-1.0 < (R5+R6)/(R5-R6) < 1.0$ --.

Signed and Sealed this
Twenty-sixth Day of April, 2016

Michelle K. Lee
*Director of the United States Patent and Trademark Office*